(12) United States Patent
Ray et al.

(10) Patent No.: US 11,136,778 B1
(45) Date of Patent: Oct. 5, 2021

(54) ADAPTIVE SELF-CENTERING APPARATUS AND METHOD FOR SEISMIC AND WIND PROTECTION OF STRUCTURES

(71) Applicant: Arrowhead Center, Inc., Las Cruces, NM (US)

(72) Inventors: Tathagata Ray, Las Cruces, NM (US); Yu-Ping Tang, Las Cruces, NM (US); Charles Park, Las Cruces, NM (US)

(73) Assignee: Arrowhead Center, Inc., Las Cruces, NM (US)

( * ) Notice: Subject to any disclaimer, the term of this patent is extended or adjusted under 35 U.S.C. 154(b) by 357 days.

(21) Appl. No.: 15/979,369

(22) Filed: May 14, 2018

Related U.S. Application Data
(60) Provisional application No. 62/505,489, filed on May 12, 2017.

(51) Int. Cl.
*E04H 9/02* (2006.01)
*F16D 49/00* (2006.01)
(Continued)

(52) U.S. Cl.
CPC ............ *E04H 9/0215* (2020.05); *E04H 9/02* (2013.01); *F16D 41/12* (2013.01); *F16D 49/00* (2013.01);
(Continued)

(58) Field of Classification Search
CPC ... E04B 1/98; E04B 1/985; E04H 9/02; E04H 9/021; E04H 9/022; E04H 9/0215;
(Continued)

(56) References Cited

U.S. PATENT DOCUMENTS

| 2,292,522 A | * | 8/1942 | Hunt | .................... D03C 13/00 139/79 |
| 2,385,479 A | * | 9/1945 | Underhill | ............... G03B 27/08 242/355 |

(Continued)

FOREIGN PATENT DOCUMENTS

| CN | 101936043 | 1/2011 |
| CN | 102605872 | 7/2012 |

(Continued)

OTHER PUBLICATIONS

Bai, Linjia , "Nonlinear dynamic behavior of steel framed roof structure with self-centering members under extreme transient wind", Engineering Structures, vol. 49, Elsevier Ltd., 2013, 819-830.

(Continued)

*Primary Examiner* — Tinh Dang
(74) *Attorney, Agent, or Firm* — Peacock Law P.C.; Justin R. Jackson; Deborah A. Peacock

(57) ABSTRACT

An adaptive self-centering device (ASCD) which uses one or more ratchet-pawl mechanisms. The hysteretic slip force of the ASCD preferably comes from a friction mechanism. The self-centering originates from the ratcheting of the pawl over the ratchet wheel and a self-centering device, in response to a force from an apparatus such as a spring. The nonlinear hardening of the apparatus, which conforms to the favorable adaptive behavior sought in modern day passive devices, stems from the mechanism of the lever within the apparatus that transforms the linear motion into rotatory motion.

10 Claims, 24 Drawing Sheets

(51) Int. Cl.
*F16D 41/12* (2006.01)
*F16H 21/44* (2006.01)
*E04B 1/98* (2006.01)

(52) U.S. Cl.
CPC ............... *F16H 21/44* (2013.01); *E04B 1/98* (2013.01); *E04H 9/021* (2013.01)

(58) Field of Classification Search
CPC ..... E04H 9/0235; E04H 9/0237; B25B 13/46; B05B 3/18; B60R 22/40; B60R 22/04; G05G 5/06
See application file for complete search history.

(56) References Cited

U.S. PATENT DOCUMENTS

| | | | | |
|---|---|---|---|---|
| 2,492,979 | A * | 1/1950 | Freer | F16D 41/12 477/24 |
| 4,616,141 | A * | 10/1986 | Hollowell | B60R 22/44 180/268 |
| 5,271,197 | A | 12/1993 | Uno et al. | |
| 5,320,298 | A * | 6/1994 | Lawson | B65H 18/12 242/543 |
| 5,491,938 | A | 2/1996 | Niwa et al. | |
| 5,732,802 | A | 3/1998 | Tsukagoshi | |
| 5,842,312 | A | 12/1998 | Krumme et al. | |
| 5,876,055 | A * | 3/1999 | Fontaine | B62D 53/0885 280/437 |
| 5,934,028 | A | 8/1999 | Taylor | |
| 6,223,483 | B1 | 5/2001 | Tsukagoshi | |
| 6,233,884 | B1 | 5/2001 | Tipping et al. | |
| 6,425,157 | B1 | 7/2002 | Ouchi et al. | |
| 6,427,393 | B1 | 8/2002 | Chen et al. | |
| 6,581,864 | B1 * | 6/2003 | Littau | A01K 89/01903 242/268 |
| 6,626,386 | B1 * | 9/2003 | Stiner | A01K 89/02 242/244 |
| 6,637,347 | B1 * | 10/2003 | Richard | B61D 19/00 105/378 |
| 6,688,058 | B2 | 2/2004 | Espinosa | |
| 7,762,030 | B2 | 7/2010 | Espinosa | |
| 8,210,558 | B2 * | 7/2012 | Mann | B62D 53/10 280/437 |
| 8,438,795 | B2 | 5/2013 | Dicleli et al. | |
| 2004/0020146 | A1 | 2/2004 | Zebuhr | |

FOREIGN PATENT DOCUMENTS

| | | |
|---|---|---|
| CN | 104018593 | 9/2014 |
| KR | 100982296 | 9/2010 |
| WO | 9627055 | 9/1996 |

OTHER PUBLICATIONS

Christopoulos, Constantin , "Frequency Response of Flag-Shaped Single Degree-of-Freedom Hysteretic Systems", Journal of Engineering Mechanics, vol. 130, ASCE, 2004, 894-903.

Filiatrault, A. , et al., "Performance Evaluation of Friction Spring Seismic Damper", Journal of Structural Engineering, vol. 126, 2000, 491-499.

Fleming, Andrew J., et al., "Integrated strain and force feedback for high-performance control of piezoelectric actuators", Sensors and Actuators A: Physical, vol. 161, Elsevier B.V., 2010, 256-265.

Fu, Yaomin , et al., "Performance Comparison of Different Friction Damped Systems", Proceedings of 15th WCEE, World Conference on Earthquake Engineering, Lisbon, Portugal, Sep. 24-28, 2012, 2012.

Gomes, Maria Idalia, et al., "Seismic resistance of earth construction in Portugal", Engineering Structures, vol. 33, Elsevier Ltd., 2011, 932-941.

Hu, Xiaobin , et al., "Ductility demand of partially self-centering structures under seismic loading: SDOF systems", Earthquakes and Structures, vol. 4, No. 4, 2013, 365-381.

Kailai, Deng et al., "Test and simulation of full-scale self-centering beam-to-column connection", Earthquake Engineering and Engineering Vibration, vol. 12, 2013, 599-607.

Kitayama, S. , et al., "Design and Analysis of Buildings with Fluidic Self-Centering Systems", Journal of Structural Engineering, ASCE, 2016, 06016105-1-13.

Ozbulut, Osman E., et al., "Seismic Performance Assessment of Steel Frames Upgraded with Self-Centering Viscous Dampers", Proceedings of the IMAC—XXXIII, Feb. 2-5, 2015, Orlando, Florida, Society for Experimental Mechanics Inc., 2015.

Sarlis, A. A., et al., "Negative Stiffness Device for Seismic Protection of Structures: Shake Table Testing of a Seismically Islated Structure", Journal of Structural Engineering, vol. 142, ASCE, 2016, 1124-1133.

Sutcu, Fatih , et al., "Seismic retrofit design method for RC buildings using buckling-restrained braces and steel framces", Journal of Constructional Steel Research, vol. 101, Elsevier Ltd., 2014, 304-313.

Zargar, Hamed , et al., "Feasibility study of a gap damper to control seismic isolator displacements in extreme earthquakes", Structural Control and Health Monitoring, vol. 20, John Wiley & Sons, Ltd., Oct. 15, 2012, 1159-1175.

Zhang, Yunfeng , et al., "Self-centering seismic retrofit scheme for reinforced concrete frame structures: SDPF system study", Earthquake Engineering and Engineering Vibration, vol. 9, 2010, 271-283.

Zhou, Z. , et al., "Development of novel-self-centering buckling-resistant brace with BFRP composite tendons", Steel and Composite Structures, vol. 16, No. 5, Techno-Press, Ltd., 2014, 491-506.

* cited by examiner

ADAPTIVE SELF-CENTERING APPARATUS AND METHOD FOR SEISMIC AND WIND PROTECTION OF STRUCTURES

CROSS-REFERENCE TO RELATED APPLICATIONS

This application claims priority to and the benefit of the filing of U.S. Provisional Patent Application No. 62/505,489, entitled "Adaptive Self-Centering Apparatus and Method for Seismic Protection of Structures", filed on May 12, 2017, and the specification thereof is incorporated herein by reference.

BACKGROUND OF THE INVENTION

Field of the Invention (Technical Field)

Embodiments of the present invention relate to a new adaptive self-centering device for structural protection using a combination of a friction-ratchet-pawl-lever mechanism. More particularly, embodiments of the present invention relate to an adaptive self-centering apparatus that is couplable to a structure and which dampens movement of the structure.

DESCRIPTION OF RELATED ART

According to the Insurance Information Institute, the average annual loss of insured property from earthquake and tsunami was $2.8 billion globally from 2014 through 2017. Per the Federal Emergency Management Agency, the estimated long-term value of the annual loss of the building stock in the USA due to earthquakes (Annualized Earthquake Loss) is $5.3 billion. However, only 10% of Californians opt for earthquake coverage, in spite of a 99% chance of occurrence of a magnitude 6.7 (Northridge-like) earthquake in Greater California over the next 30 years.

Keeping pace with the exponential growth in urban population, the construction of tall residential and commercial buildings in urban habitat is a global phenomenon presently. According to the Global Tall Building Database of the Council of Tall Buildings and Urban Habitat, currently there exist 130 buildings over 300 meters ("m"), 1331 buildings over 200 m, and 4285 buildings over 150 m, globally. Per the National Oceanic and Atmospheric Administration, hurricanes in the continental U.S. cause, on average, damage of about $3 billion per landfall and about $5 billion annually. Owing to their slender shape, tall structures often experience along-wind turbulence buffeting and cross-wind vortex-induced vibrations. Suppression of such vibrations is necessary for safety of the load bearing members, non-structural elements, and the building envelope. Further, prolonged exposure to vibrations affects the mental and physical health of the occupants, and may lead to migraines and nausea.

To build an earthquake resistant building, the designers are faced with two choices. They can design a very stiff structure that will not deform much during an earthquake. This type of structure might encounter seismic forces huge enough to incur damage. Another option is to build relatively flexible buildings. These buildings may encounter lower forces, but nevertheless experience deformations large enough to suffer damage. Seismic isolation devices can limit the seismic force experienced by a stiff structure. Seismic dampers can limit the deformation of the flexible structures by absorbing seismic energy. However, it appears that structural designers in the United States are not feeling confident in using seismic protective systems as suggested by the design codes, and the additional cost of outfitting buildings with protective devices precludes the designers from using them.

Seismic waves have higher energy content at higher frequencies (around 1 Hz), while hurricane and non-hurricane windstorms have higher energy content at lower frequencies (0.001-0.1 Hz). For seismic protection of structures, three types of isolators are used currently: (a) elastomeric bearings, (b) lead-rubber bearings, and (c) friction pendulum bearings. Modern friction pendulums, such as the triple friction pendulum (TFP), generate adaptive variation in stiffness through multiple sliding surfaces. However, the energy dissipation in TFP is greater at moderate deformations but decreases significantly at larger deformations. This often leads to larger deformations that can damage the TFP itself for extreme events. Further, the TFP cannot achieve full self-centering when the lateral load is removed. Tuned mass dampers (TMD) with various improvisations are the most popular devices for mitigation of wind-induced vibration of tall buildings. However, TMD loses its effectiveness even with 5% mistuning. Implementation of multiple TMDs requires usage of valuable floor area which could have been rented otherwise. Though substantially effective, externally powered (active/semi-active) TMDs require power which might range to Megawatts. Since viscous dampers (VD) suffer the drawback of not being functional at low frequency wind excitations, linear and nonlinear VDs have been implemented either in large numbers or in combination with passive or active TMDs and/or tuned liquid column dampers (TLCDs) for wind-induced vibration mitigation.

Residual deformation is a common problem when a structure experiences inelastic deformations during a seismic event. Residual deformation of more than about 1% of the story height or even as little as only about 0.5% of the story height can necessitate full replacement of the structure rather than repair. Residual structural deformation thus has started to be recognized as a complimentary design parameter in the evaluation of structural and non-structural damage in performance based earthquake engineering. Several innovative self-centering supplemental structural systems have been developed in the past. The most significant characteristic of these systems is their flag-shaped hysteretic response through which small or zero residual drift can be achieved. This flag shaped hysteretic response can be achieved using supplemental mechanical devices. Self-centering bracing systems, where the structural braces are modified by mechanical self-centering devices, have been proposed. Using shape memory alloys is another way of achieving self-centering response. Fluidic self-centering devices, where the energy dissipation increases with the frequency of excitation, have also been proposed. Such systems exhibit the self-centering behavior or the flag-shaped hysteretic response with constant post-elastic hardening. However, a prime characteristic in modern day seismic protective systems is their adaptive behavior. This adaptive behavior involves the following attributes: high stiffness at low level excitations (e.g., wind or machine loads), moderate energy dissipation and low stiffness at moderate excitations (e.g., design basis earthquake), and high energy dissipation and high stiffness at severe excitations (e.g., maximum considered earthquake) or at large displacements.

There is thus a present need for a method and apparatus which reduces structural damage caused by earthquakes and wind. Embodiments of the present invention solve this need.

BRIEF SUMMARY OF EMBODIMENTS OF THE PRESENT INVENTION

An embodiment of the present invention relates to an adaptive self-centering apparatus having a ratchet wheel; a friction wheel, the friction wheel and the ratchet wheel rotatable about a common axis; a pawl attached to the friction wheel and configured to couple the ratchet wheel to the friction wheel such that they rotate together in a first direction; a cartridge communicably coupled to the ratchet wheel such that linear motion of the cartridge causes rotational movement of the ratchet wheel; a mechanism to force the cartridge toward a centered position; and a friction pad configured to rub against the friction wheel. The mechanism can include a spring and the friction pad can include a brake pad. Optionally, the brake pad can include a pair of brake pads that are configured to clamp against the friction wheel.

The adaptive self-centering apparatus can also include a slider on which the cartridge translates along at least a portion thereof. Optionally, the ratchet wheel can include two ratchet wheels, the friction wheel can include two friction wheels, the cartridge can include two cartridges and each of the two cartridges can be connected to a respective one of the two ratchet wheels, and the pawl can include two pawls, and each of the two pawls can be attached to a respective one of the friction wheels and configured to couple a respective one of the ratchet wheels to a respective one of the friction wheels.

Optionally, the mechanism can include two springs, each of the two springs can be configured to force a respective one of the two cartridges in an opposing direction from one another. The adaptive self-centering apparatus can also include a center cartridge disposed between the two cartridges. The adaptive self-centering apparatus can also include a base, which can be attached to a building.

An embodiment of the present invention also relates to an adaptive self-centering apparatus having first and second ratchet wheels; first and second friction wheels, the first friction wheel and the first and second ratchet wheels rotatable about a common axis; a first pawl attached to the first friction wheel and configured to couple the first ratchet wheel to the first friction wheel such that they rotate together in a first rotational direction; a second pawl attached to the second friction wheel and configured to couple the second ratchet wheel to the second friction wheel such that they rotate together in a second direction; and a cartridge configured to be communicably coupled to a structure and the adaptive self-centering apparatus configured such that movement of the cartridge in a first direction causes the first pawl to engage the first ratchet wheel and such that movement of the cartridge in a second direction causes the first pawl to slip over the first ratchet wheel. The adaptive self-centering apparatus can include one or more friction pads positioned to press against the first friction wheel. The adaptive self-centering apparatus can include a ratchet wheel cartridge communicably coupled to the first ratchet wheel and positioned so as to experience movement in response to movement of the cartridge. In one embodiment, the adaptive self-centering apparatus of can be configured such that movement of the cartridge in the first direction causes the second pawl to slip over the second ratchet wheel and such that movement of the cartridge in the second direction causes the second pawl to engage the second ratchet wheel.

An embodiment of the present invention also relates to a method for dampening movement of a building structure that includes converting linear movement of the building structure via a cartridge into rotational movement of a ratchet wheel connected to the cartridge; coupling a friction wheel to the ratchet wheel with a pawl; and pressing a friction pad against the friction wheel to generate a braking action. In the method, converting linear movement can include converting linear movement with a lever that is pivotally connected to a rotatable ratchet wheel. The method can also include forcing the cartridge toward a starting position, which can itself be accomplished by uncompressing a spring. Optionally, pressing a friction pad can include clamping a pair of friction pads onto opposing surfaces of the friction wheel.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Figure 1:
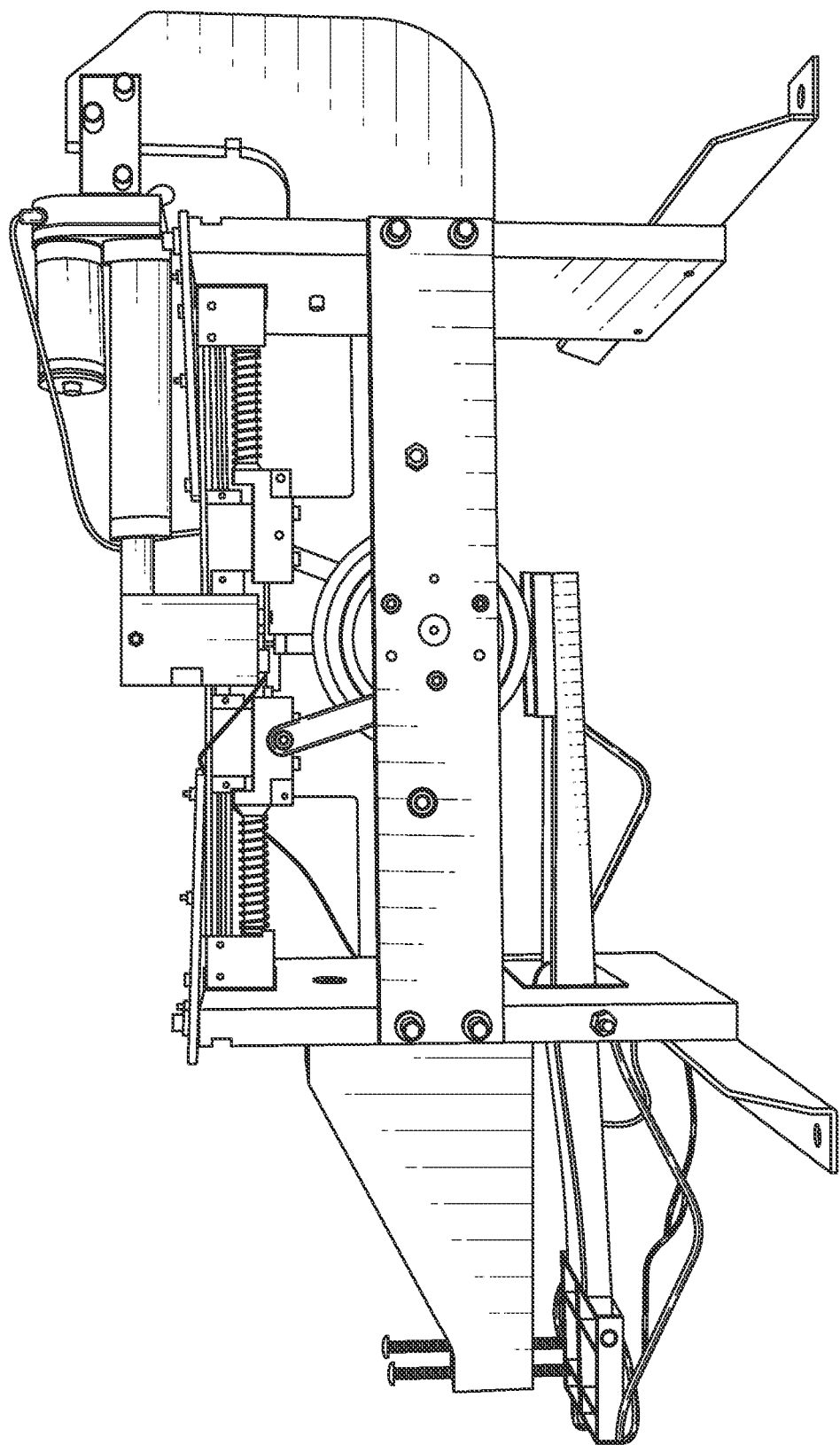
FIG. 1 is a photograph illustrating an embodiment of the present invention.

Embodiments of the present invention are related to an adaptive self-centering device ("ASCD"), which preferably comprises a ratchet-pawl mechanism that functions similar to that of a mechanism of a traditional bicycle. For example, while riding a bicycle when we pedal forward, we apply force, and when we pedal backward we rarely need any force. Embodiments of the present invention utilize this functional characteristic to provide a self-centering device such that: pedaling forward translates into moving away from the center by breaking away the hysteretic yield force, when the pawl and the ratchet are locked together; and pedaling backward translates into moving towards the center with no hysteretic yield force to overcome, when the pawl ratchets over the ratchet wheel. The arrangement of levers in this apparatus generates the second and third criterion of the adaptive behavior, whereas the first criterion can be drawn easily from the elastic stiffness of the parent structure when the device is connected to it in parallel.

This apparatus can be installed within a diagonal, chevron, or toggle bracing set-up in a portal frame or can be used as an isolator. Embodiments of the present invention can manifest adaptive force-deformation behavior which entails lower post-elastic stiffness and dissipation for smaller excitations and higher post-elastic stiffness and dissipation for larger excitations. Embodiments can also allow for adjustable slip load which is independent of the structure weight.

The primary parts of the apparatus of an embodiment of the present invention include: two friction wheels, two ratchet wheels, two pawls, a shaft, two re-centering springs, three horizontal sliders, and a set of levers. The friction wheels and the ratchet wheels rotate about the shaft, which is static. Each pawl is pinned to one friction wheel and presses the rim of one ratchet wheel through a torsion spring. A counterweight force is applied radially to the friction wheel. External lateral force, that originate from structural vibrations, is applied tangentially to the ratchet wheel through the horizontal sliders and levers. These levers are responsible for the adaptive nature of the device.

The adaptive force-deformation hysteretic behavior of the apparatus for quasi-static displacement input and for various values of counterweight can optionally be generated experimentally. These responses are also captured analytically by using basic mechanics. Sensitivity analyses are preferably performed to evaluate the desired design parameters of the apparatus. Preliminary nonlinear dynamic analyses conducted with selected strong pulse cycloidal ground motions illustrated that an apparatus according to an embodiment of the present invention will protect a structure better than existing self-centering devices and the state-of-the-art isolator triple friction pendulum.

The following sections describe the hardware assembly of the device, mechanism of motion, analytical formulation of the force-deformation response, instrumentation on the device for obtaining the experimental force-deformation response, comparisons of the analytical and experimental responses, advantages of the device as energy dissipater and isolator, and some design recommendations of the device through sensitivity analyses.

Hardware Description of the Prototype ASCD

Although the maximum displacement capacity of the constructed prototype of FIG. 1 is about ±40 mm with a maximum counterweight force of about 111.21 N, apparatuses can be constructed to accommodate any desired maximum displacement and maximum counterweight force in accordance with the teachings of this application.

Referring now to the drawings, an embodiment of the present invention relates to an adaptive self-centering device (ASCD) that preferably includes two friction wheels, front friction wheel 1 and back friction wheel 31; two ratchet wheels, front ratchet wheel 2 and back ratchet wheel 32; two pawls, front pawl 4 and back pawl 34; shaft 3, which is most preferably a static shaft; two re-centering springs, right 7 and left 8; slider 10; two levers, left 6 and right 5; counterweight assembly 16 preferably comprising friction pad 9, counterweight screw 15, and three cartridges, center 18, right 19, and left 20. An embodiment also preferably includes: bracket 13 for lateral stability; leg assembly 14 for vertical support; left plunger 12 and right plunger 11, for compressing the re-centering springs; and plunger stops 17 for containing the plungers inside the re-centering springs. Of course, bracket 13 can comprise any structure which supports shaft 3. For example, bracket 13 can comprise sidewalls of the ASCD. The ASDC is preferably attached to a portion of the structure or another structure at base 23, which is preferably rigidly attached to or otherwise incorporated into leg assembly 14. The attachment of base 23 to a portion of the structure or another structure can be accomplished via any known attachment mechanism that provides a secure attachment, including but not limited to bolting, welding, screwing, setting in concrete, combinations thereof, and the like. In one embodiment, slider 10 and or cartridges 18, 19, and/or 20 can include bearings or wheels which reduce friction and better enable the cartridges to move about on slider 10. In one embodiment, the cartridges can ride atop slider 10, such that slider 10 is a track disposed under the cartridges. In one embodiment, slider 10 can comprise a track from which the cartridges are suspended. In one embodiment, slider 10 can pass through all or a portion of the cartridges.

The in-plane external lateral load in the left or right directions can be applied to the apparatus through center cartridge 18. The front and the right parts preferably generate the adaptive self-centering response in the right direction, while the back and the left parts generate the same in the left direction. In one embodiment, shaft 3 preferably always remains static.

Friction wheel 1 and ratchet wheel 2 preferably rotate about shaft 3. Pawl 4 is preferably pinned to friction wheel 1 by spring 22, which can optionally be a torsion spring, and presses the teeth of ratchet wheel 2. Shaft 3 keeps the friction wheel and the ratchet wheel in position. Shaft 3 is preferably made of a rigid material, such as a steel bar, and is preferably fixed to bracket 13 by collars which are preferably formed from steel. Horizontal slider 10 is located at the top of the assembly. Cartridges 18, 19, and 20 move about on slider 10 when an external lateral in-plane load is applied through center cartridge 18. In one embodiment, cartridges 18, 19, and/or 20 can comprise blocks, carriages, or other structures that are configured to traverse, at least partially, slider 10. Right cartridge 19 or left cartridge 20 are preferably connected to the front or back of ratchet wheel 2 by right lever 5 or left lever 6. Re-centering springs 7 and 8 are connected horizontally to the right and left cartridges. The whole system is held in a stable position by bracket 13 and leg assembly 14 as illustrated in FIG. 2.

Figure 2:
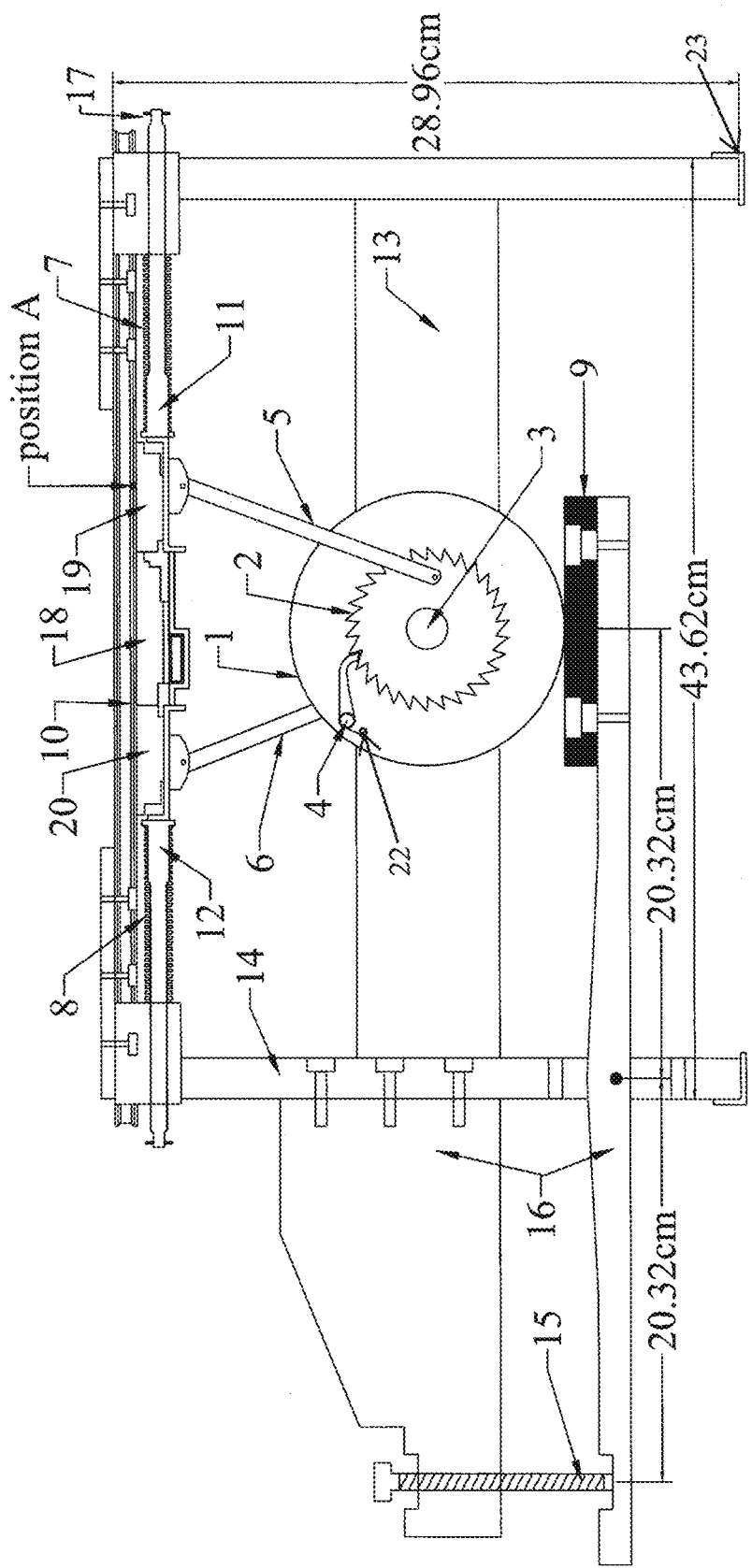
FIGS. 2 and 3 are schematic drawings which respectively illustrate an adaptive self-centering device ("ASCD") according to an embodiment of the present invention in a normal unloaded configuration and in a loaded configuration.
Figure 3:
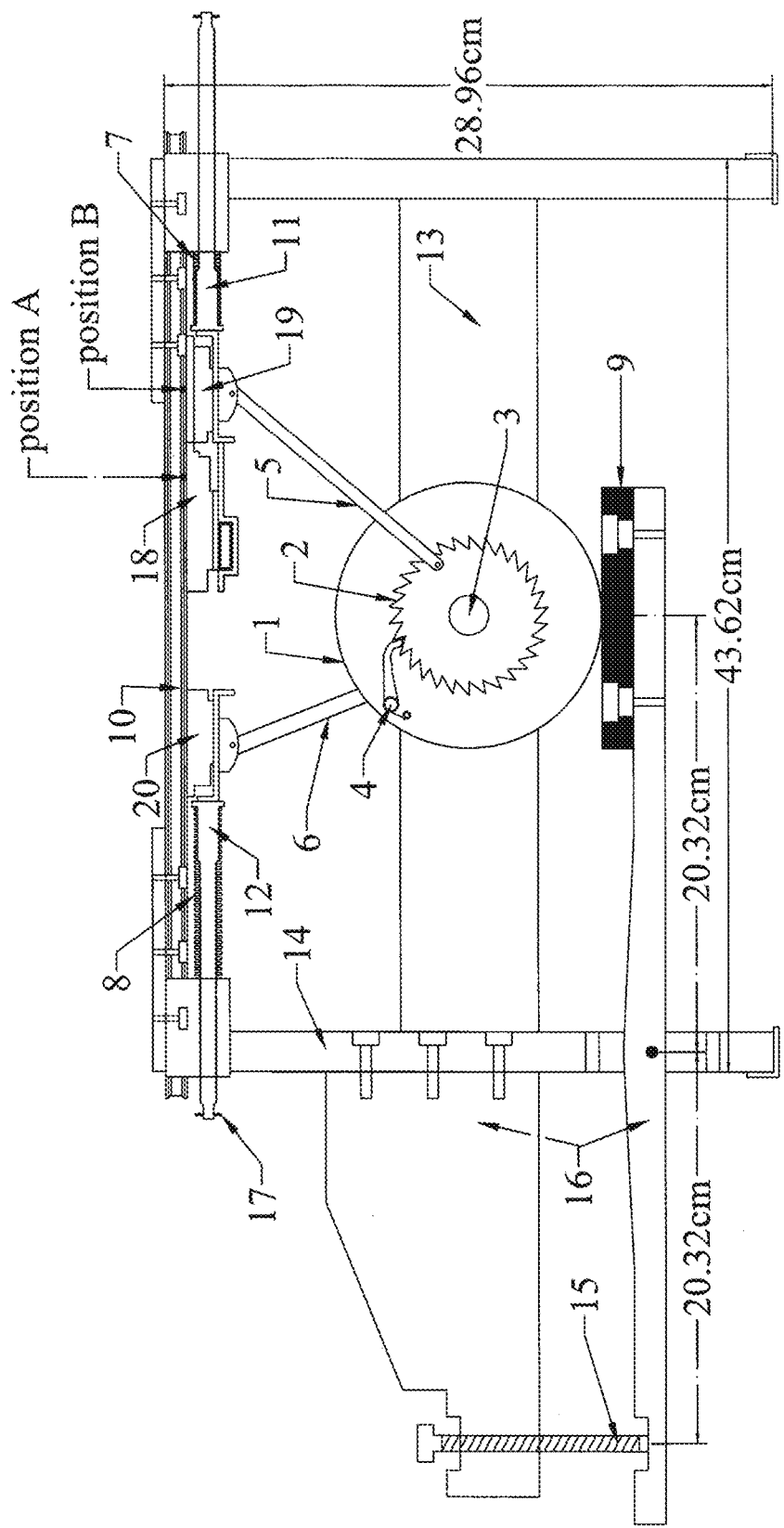
Figure 4:
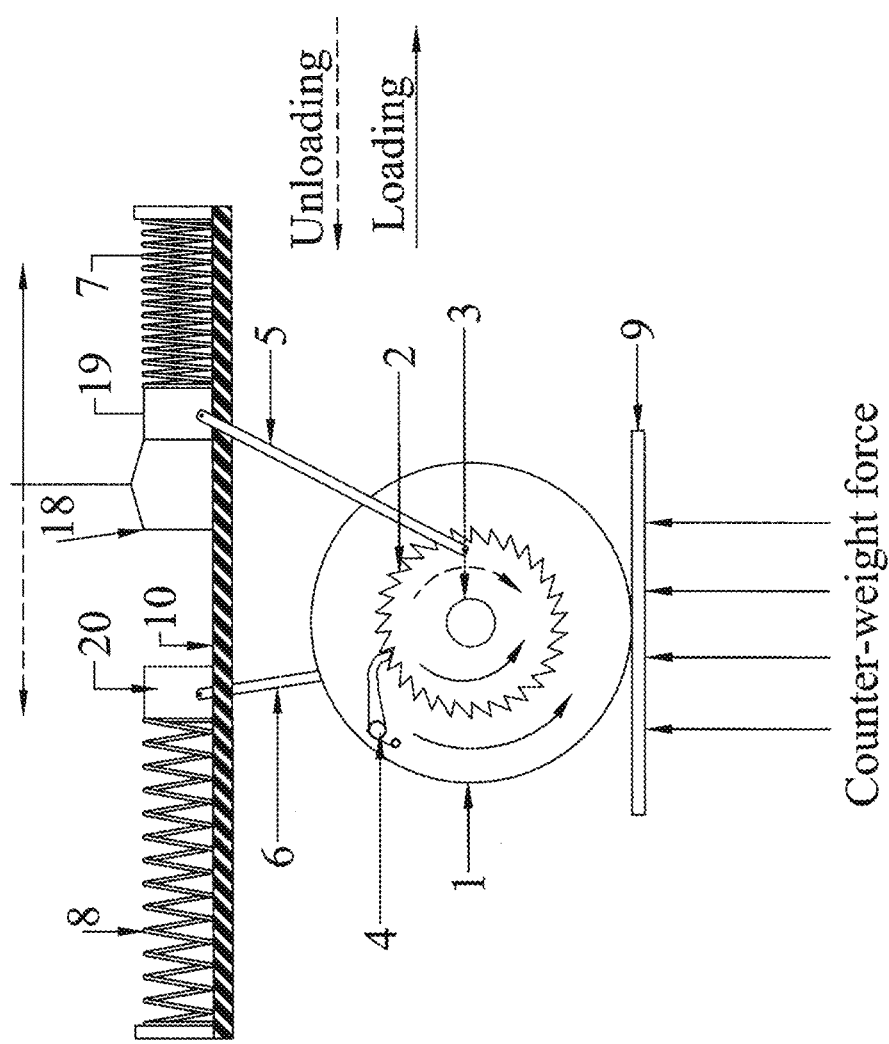
FIG. 4 is a schematic drawing of an ASCD which illustrates the mechanism of the motion.

In one embodiment, counterweight assembly 16 preferably comprises a bracket attached to the left leg, a lever pinned to the left leg, counterweight screw 15 pressing the lever downward and anchored to the bracket, and friction pad 9 pressing the friction wheel upward with the counterweight force P (See FIGS. 6-9), as best illustrated in FIG. 2.

Mechanism of the Motion Generating Self-Centering

An embodiment of the mechanism is best illustrated in FIGS. 3-6. With the application of lateral load towards the right as applied to center cartridge 18, center cartridge 18 and right cartridge 19 move through the slider from position A to B. This locks pawl 4 with ratchet wheel 2. Friction wheel 1 and ratchet wheel 2 start rotating together in counterclockwise direction about shaft 3, once the breakaway friction between friction wheel 1 and friction pad 9 is exceeded by the applied lateral load. Right re-centering spring 7 preferably gets compressed during this motion.

Figure 5:
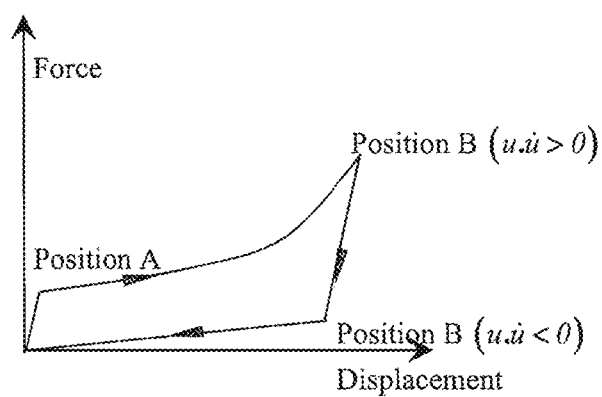
FIG. 5 is a graph that illustrates hysteresis (force-displacement loop) for adaptive self-centering according to an embodiment of the present invention.

During unloading from position B, ratchet wheel 2 rotates in clockwise direction and pawl 4 ratchets over ratchet wheel 2. Friction wheel 1 preferably remains static. A sudden drop in the restoring force, due to the change in hysteretic friction force direction between friction pad 9 and friction wheel 1 preferably occurs at this stage of operation. The now compressed right re-centering spring 7 pushes back the plunger as center cartridge 18 and right cartridge 19 move from position B back to position A. Note that the restoring force preferably drops to zero or almost zero when right cartridge 19 returns to its initial un-displaced position A, as right re-centering spring 7 regains its original length from compression. Thus, full self-centering response is achieved. The lever mechanism results in adaptive hardening as illustrated in FIG. 5, and will be explained further herein.

During the above loading-unloading cycle in the right direction, the "back" and "left" parts, as mentioned earlier, preferably remain static. These parts generate the self-centering in the left direction through a similar mechanism.

Analytical Formulation of the Motion

For the analytical model, the foregoing two cases of the mechanism of loading-unloading in the right direction have been considered. Case 1 describes the motion when right cartridge 19 moves away from the center, that is from position A to B (see FIGS. 6 and 7). Case 2 describes the motion when right cartridge 19 moves back towards the center, that is from position B to A (see FIGS. 8 and 9).

Case 1—Loading: Right Cartridge Moves Towards Right

Figure 6:
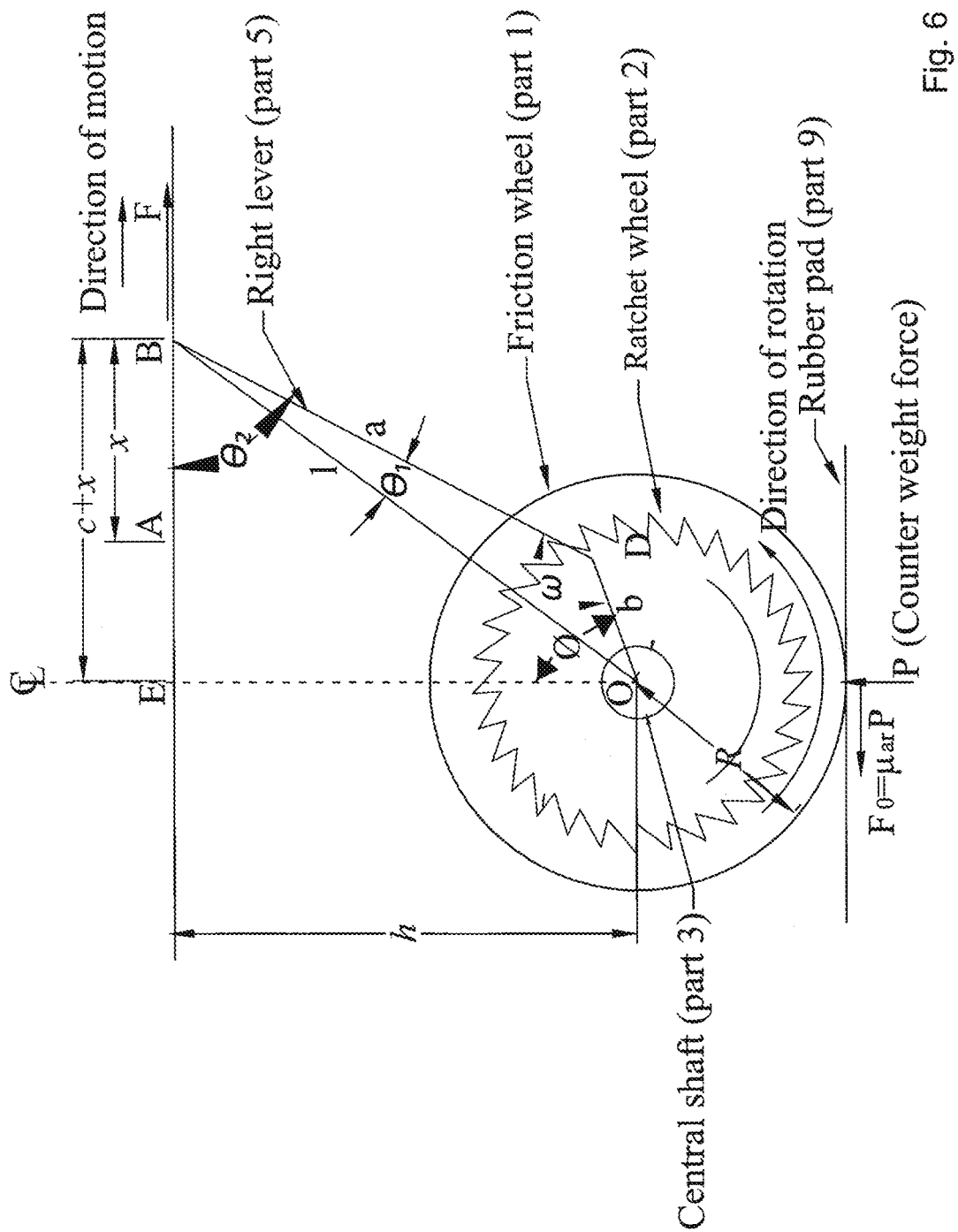
FIG. 6 is a free body diagram of the ASCD (Case 1—Right cartridge moves away from the center (from A to B))
Figure 7:
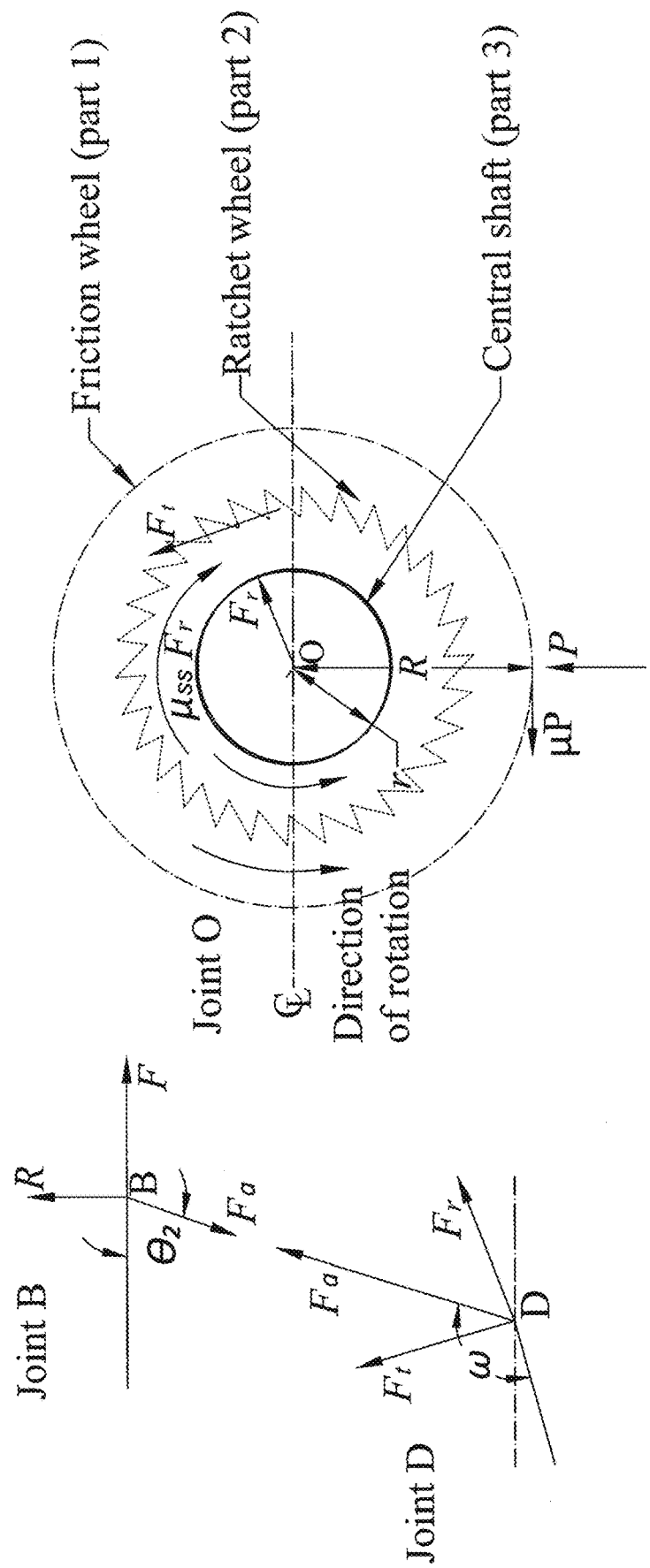
FIG. 7 is a free body diagram of the ASCD (Case 1—Joints B, D and O)

Referring now to FIGS. 6 and 7, F is the external lateral force acting towards the right. The component of this force (BD) that is transferred to right lever 5 is $F_a$. P is the force exerted on friction wheel 1 by pad 9 to produce the breakaway friction force $\mu_{ar}P$. Although pad 9 is generally referred to as a "rubber pad" such description is merely intended to apprise the reader of the most preferred embodiment and other materials, including but not limited to other elastic or flexible materials, can be used and will provide desirable results. Here $\mu_{ar}$ is the frictional coefficient between friction pad 9 and friction wheel 1 (aluminum on rubber in the most preferred embodiment). Accordingly, in one embodiment, one or more brake pads could also be used. Likewise, although the figures illustrate an embodiment wherein the friction pad is forced upward against an outer edge of the friction wheel, in one embodiment, a pair of friction pads can be configured to clamp onto front and back sides of the friction wheels in the same manner as automobile brakes. Still further, drum-type brakes can also be used in lieu of or in combination with disc brakes. In one embodiment, the force on pad 9, and hence the hysteretic yield force and the maximum force of the ASCD, can be adjusted with hydraulic brakes after installation.

In one embodiment, the friction pad which can include a brake shoe, can be replaced without dismantling the device. Whereas, in the tendon-based or SMA-based devices, neither the device parameters can be changed, nor any repair can be done without dismantling the device. The energy dissipation in ASCD is independent of its excitation frequency. Hence it can absorb energy of the high frequency seismic loading and of low frequency wind loading, including both forced and free vibrations. The ASCD can be installed with diagonal, chevron, or toggle braces. Hence, no floor space is required.

As best illustrated in FIG. 6, the right cartridge preferably moves from position A and to position B. In this embodiment, x is the distance between A and B. (c+x) is the distance from point E to point B. Point O is the center of the shaft and wheels. Point D is the center of the pin where right lever 5 is connected to ratchet wheel 2. h is the vertical height from point O to point E. r (see FIG. 7) is the radius of the shaft.

$$|BD|=a, |OB|=I, |OD|=b, \theta_1=\langle OBD, \theta_2=\langle DBE, \omega=\langle ODB,$$

From the free body diagram of joint B (see FIG. 7), $$F_a = F/\cos(\theta_2) \tag{Equation 1}$$

wherein $F_a$ is the tensile force in the member BD.

From the free body diagram of joint D (see FIG. 7), resolving the force $F_a$ into tangential ($F_t$) and radial ($F_r$) components shows $$F_t = F_a \sin(\omega) \tag{Equation 2}$$

$$F_r = F_a \cos(\omega)$$

Wherein $F_r$ generates the friction force ($\mu_{ss}F_r$) between the ratchet wheel and the shaft (steel on steel). $\mu_{ss}$ is the friction between steel on steel.

r is the radius of the shaft (see FIG. 7). The moment generated by the friction between ratchet and shaft about O is given by $$M_{ss}=\mu_{ss}F_r \quad \text{(Equation 3)}$$

R is the radius of the friction wheel (see FIG. 7). The moment generated by the breakaway friction force between the rubber pad and the friction wheel about O is given by $$M_{ar}=\mu_{ar}PR \quad \text{(Equation 4)}$$

For the motion to occur, the active moment generated by $F_t$ about O must overcome the reactive frictional moments $M_{ss}$ and $M_{ar}$. Or in other words, $$F_t b = M_{ss}+M_{ar} \quad \text{(Equation 5)}$$

Combining equations 1 to 5 gives $$F=\mu_{ar}PR\cos(\theta_2)/\{b\sin(\omega)-r\mu_{ss}\cos(\omega)\} \quad \text{(Equation 6)}$$

Using elementary geometry, the following expressions were obtained for the angles $\omega$ and $\theta_2$:

$$\omega = \sin^{-1}\left[\sqrt{\{(a+b)^2-l^2\}\{l^2-(a-b)^2\}}\,\big/(2ab)\right] \quad \text{(Equation 7)}$$

$$\theta_2 = \sin^{-1}\left[\sqrt{\{(a+b)^2-l^2\}\{l^2-(a-b)^2\}}\,\big/(2al)\right] + \sin^{-1}(h/l)$$

$$l = \sqrt{h^2+(c+x)^2}$$

Considering the reactive force from the re-centering spring, Equation 6 gets modified as $$F=\mu_{ar}PR\cos(\theta_2)/\{b\sin(\omega)-r\mu_{ss}\cos(\omega)\}+k_{rc}x \quad \text{(Equation 8)}$$

Here $k_{rc}$ is the stiffness of the re-centering spring. Equation 8 and Equation 7 define the relationship between the applied force F and the distance traversed x when the ratchet wheel and the friction wheel rotate together in a locked configuration and the right cartridge moves away from the center.

Case 2—Unloading: Right Cartridge Moves Towards Left

Figure 8:
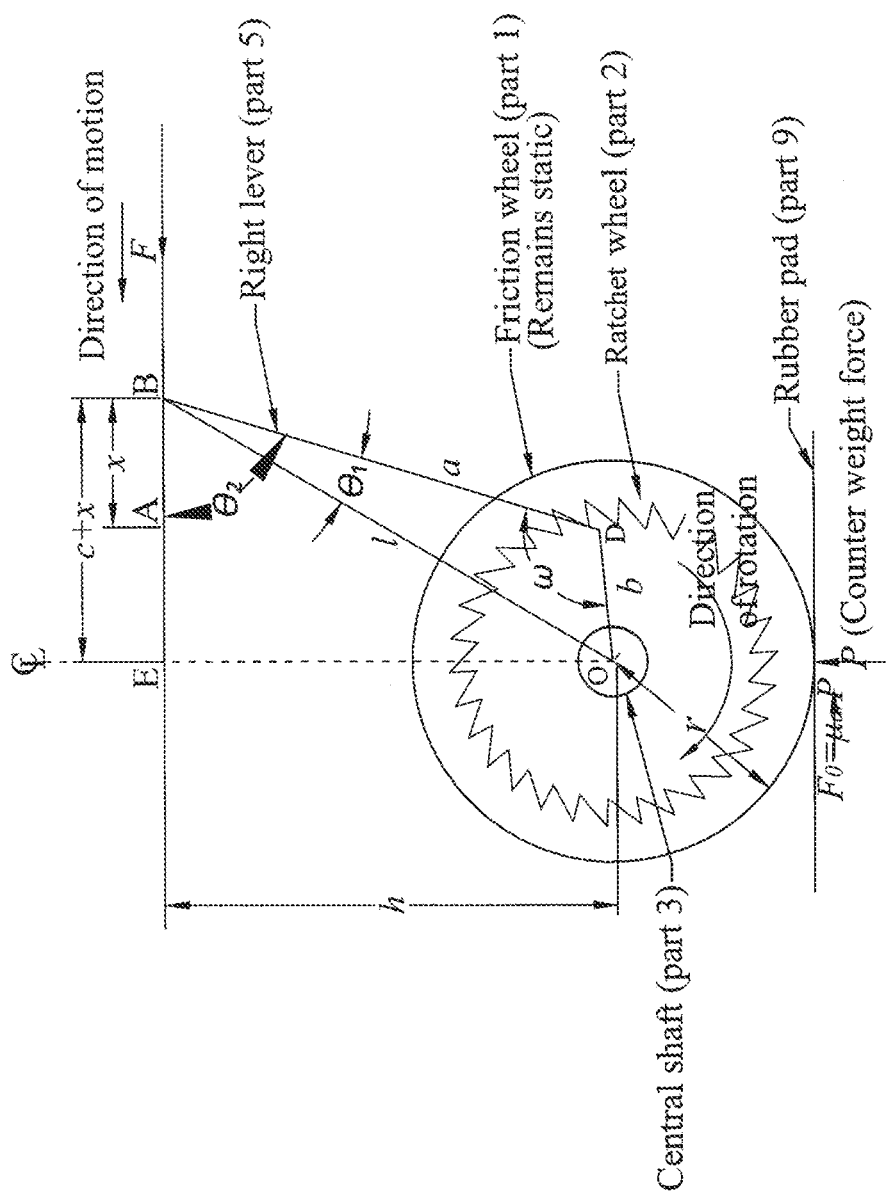
FIG. 8 is a free body diagram of the ASCD (Case 2—Right cartridge moves towards the center)
Figure 9:
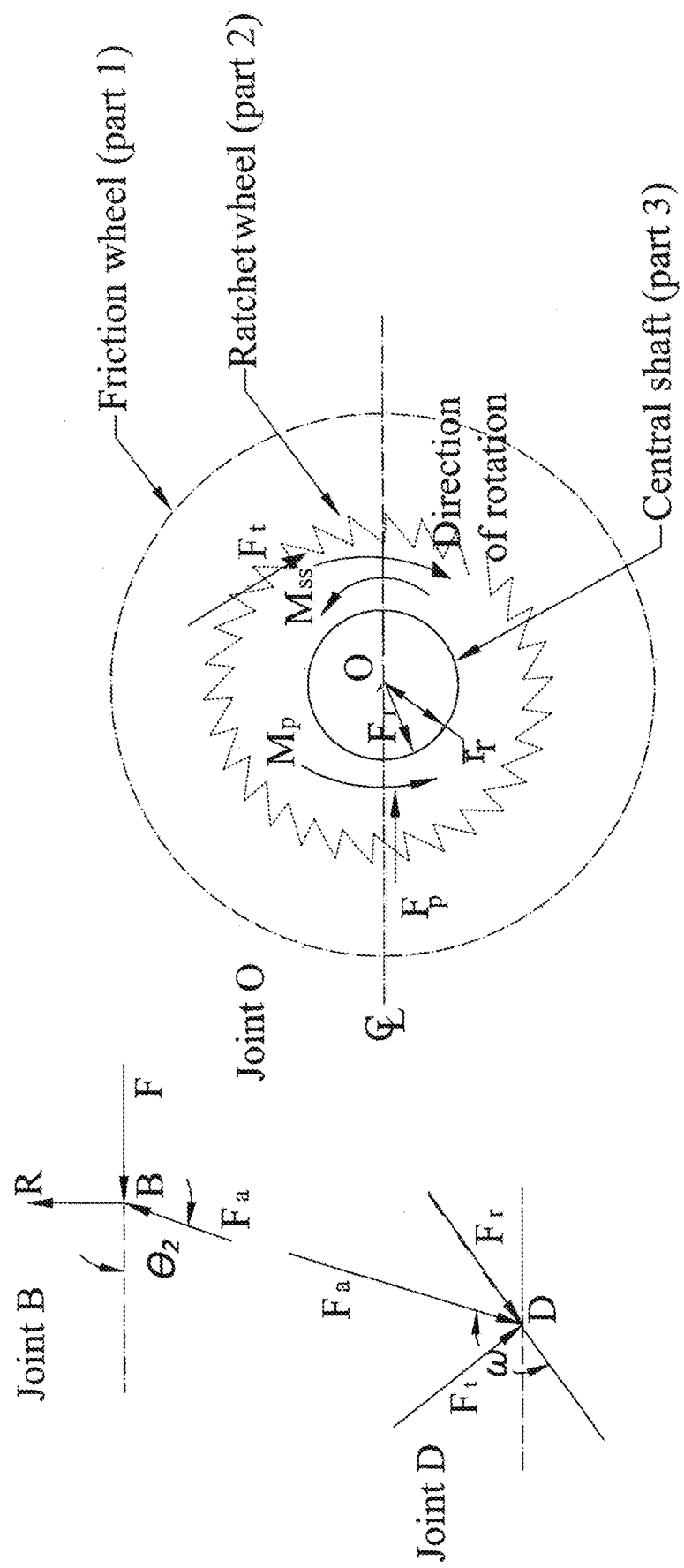
FIG. 9 is a free body diagram of the ASCD (Case 2—Joints B, D, and O)

As best illustrated in FIGS. 8 and 9, when the right cartridge moves from right to left, the ratchet wheel rotates in a clockwise direction. The friction wheel remains static as the pawl ratchets over the ratchet wheel and thus the breakaway friction force between the friction pad and the friction wheel need not be overcome by the active force F. From the free body diagram of joint B (see FIG. 9), $$F_a = F/\cos(\theta_2) \quad \text{(Equation 9)}$$

wherein $F_a$ is the compressive force in the member BD.

From the free body diagram of joint D (see FIG. 9), resolving the force $F_a$ into tangential ($F_t$) and radial ($F_r$) components gives $$F_t = F_a \sin(\omega)$$

$$F_r = F_a \cos(\omega) \quad \text{(Equation 10)}$$

wherein $F_r$ generates the friction force ($\mu_{ss}F_r$) between the ratchet wheel and the shaft (steel on steel). $\mu_{ss}$ is the friction between steel on steel.

The reactive frictional moment $M_{ss}$ (see Equation 3) due to the relative motion between the ratchet wheel and the shaft will act as illustrated in FIG. 9. The relative motion between the pawl and the ratchet wheel will give rise to an additional reactive frictional moment $M_p$, as the torsion spring causes the pawl to press on the ratchet wheel by a force $F_p$. This moment is given by $$M_p = \mu_{ss}F_p r_r \quad \text{(Equation 11)}$$

Here $\mu_{ss}$ is the frictional coefficient between the pawl and the ratchet wheel (steel on steel) and $r_r$ is the mean radius of the ratchet wheel.

For the mechanism to occur, the active moment generated by $F_t$ about O must overcome the reactive frictional moments $M_{ss}$ and $M_p$. Or, in other words, $$F_t b = M_{ss}+M_p \quad \text{(Equation 12)}$$

Combining Equations 9 to 12 gives $$F=\mu_{ss}F_p r_r \cos(\theta_2)/\{b\sin(\omega)-r\mu_{ss}\cos(\omega)\} \quad \text{(Equation 13)}$$

Considering the restoring force from the re-centering spring, Equation 13 gets modified as $$F=\mu_{ss}F_p r_r \cos(\theta_2)/\{b\sin(\omega)-r\mu_{ss}\cos(\omega)\}+k_{rc}x \quad \text{(Equation 14)}$$

Equation 14 and Equation 8 define the relationship between F and x when the friction wheel is stationary, the pawl ratchets over the ratchet wheel, and the right cartridge moves towards the center.

Advantages of the ASCD Over the Existing Self-Centering Devices and Isolators (Application as an Energy Dissipater)

Embodiments of the present invention can produce full self-centering with maximum possible energy dissipation and nonlinear hardening (wherein the required force does not linearly correlate with the magnitude of the displacement (see FIG. 5)). Note that special shape memory alloys ("SMA") generate nonlinear hardening. However, as the SMA manifests the same post-elastic stiffness in loading and unloading, the energy dissipation is less than the ASCD, which has lower post-elastic stiffness in unloading. The greater energy dissipation in the ASCD further helps in mitigating the displacement demand of the parent structure.

The parent structure will dissipate less energy if the apparatus connected to it dissipates more energy. Hence the energy induced damage in the parent structure will be less if the connected apparatus has larger dissipation capacity. Further, the displacement induced damage in the parent structure will be less if its ductility demand is less.

Adjustability of the Counterweight

Embodiments of the present invention offer the flexibility of adjusting the counterweight force and hence the hysteretic yield force and the maximum force. This is beneficial for adjusting the device for a predicted wind storm. Hence, the ASCD can be described as a passive device, exhibiting adaptive benefits.

Ease of Repair

In one embodiment, friction pad 9 can be replaced after substantial wear and tear without dismantling the apparatus. This provides a further advantage over the tendon based or SMA based devices, where the device needs to be disassembled for repair.

Slippage of the Pawl

Figure 11:
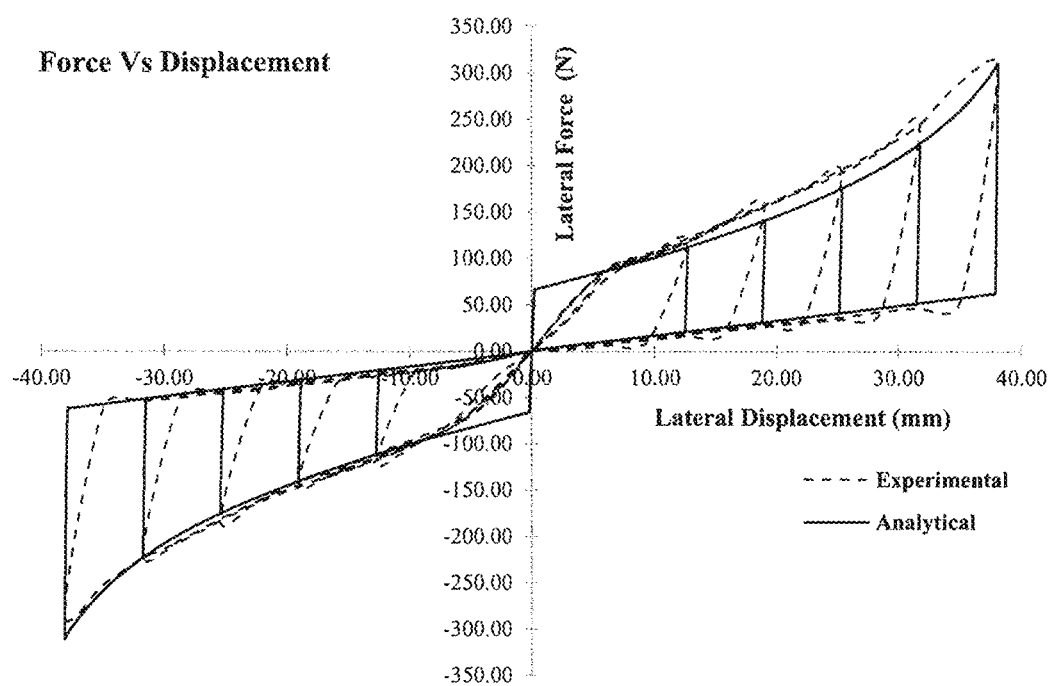
FIG. 11 is a graph which illustrates a force versus displacement curve of the ASCD for counterweight of 111.21N.
Figure 12:
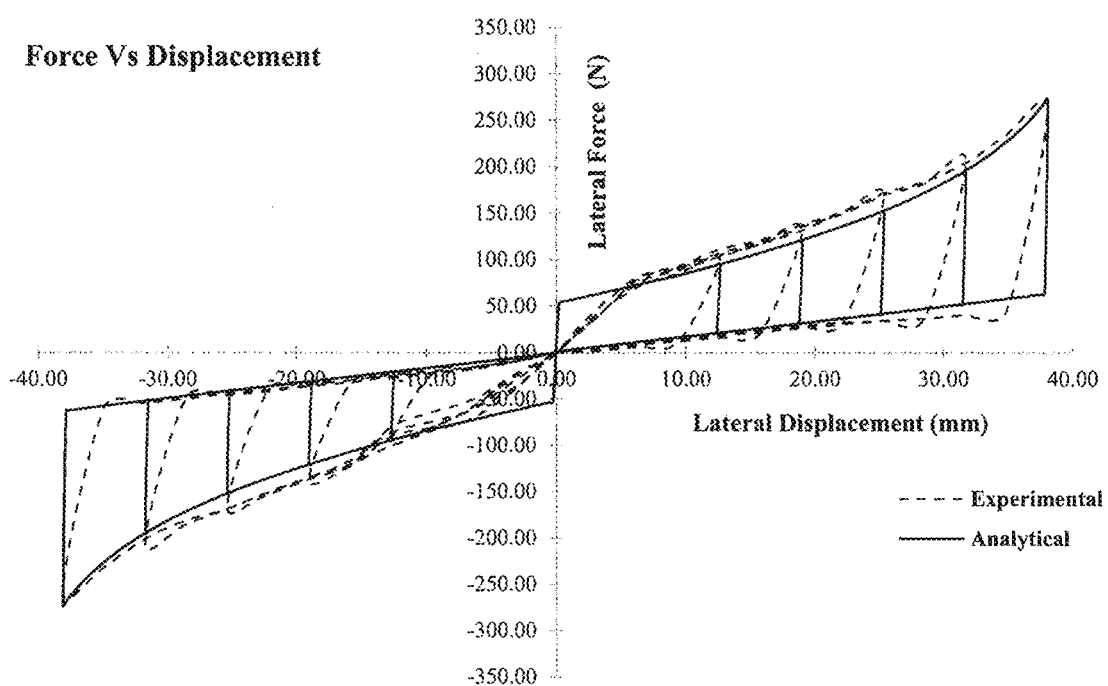
FIG. 12 is a graph which illustrates a force versus displacement curve of the ASCD for counterweight of 88.96N.
Figure 13:
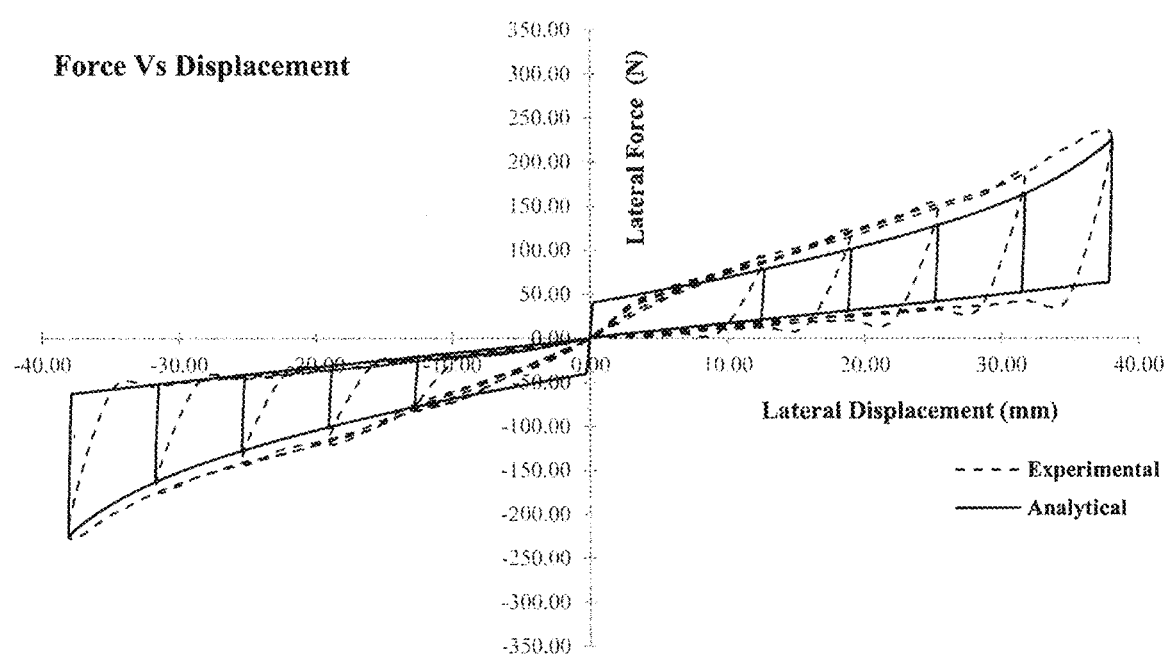
FIG. 13 is a graph which illustrates a force versus displacement curve of the ASCD for counterweight of 66.72N.

Note that there are differences between analytical and experimental responses regarding the elastic stiffness of the device (see FIGS. 11-13). During unloading, displacement input is manual and thus it is difficult to obtain precise digital data of the displacement with finer resolutions. During loading, the difference between the analytical and experimental responses is chiefly due to the fact that the pawl slips over the sloping surface of the ratchet tooth for some distance before getting locked (i.e. the "play" in the ratchet mechanism). This length of the slipping can be reduced by choosing the ratchet wheel appropriately, such that the slip length before getting locked is significantly less, preferably 1% of the maximum displacement or less. This produces the expected adaptive self-centering loop in dynamic excitation as well.

Dynamic Effect

The analytical formulations and the experimentations of the ASCD are performed for quasi-static excitations. For dynamic excitations, the inertia effects may modify the force deformation relationships. The inertia effect of the components, other than the friction wheel, is expected to be negligible, due to their smaller mass. Taking the polar moment of inertia ($J_f$) of the friction wheel into account, Equation 5 is modified as:

$$F_r b = M_{ss} + M_{ar} + J_f \ddot{\phi} \quad \text{(Equation 15)}$$

Here $\ddot{\phi}$ is the rotational acceleration of the wheel, where $\phi$ (see FIG. 6) is given by, $$\phi = 270° - \theta_2 - \omega \quad \text{(Equation 16)}$$

$\ddot{\phi}$ denotes the second derivative of # with respect to time. Further, the force-displacement relationship as given in Equation 6 will be modified as:

$$F = \{\mu_{ar} PR + J_f \ddot{\phi}\} \cos(\theta_2)/\{b \sin(\omega) - r\mu_{ss} \cos(\omega)\} \quad \text{(Equation 17)}$$

During loading, the dynamic effect is expected to increase the restoring force of the device with increasing acceleration. This results in lesser displacement demand. Further, the dynamic effect is absent during unloading, as the friction wheel remains static. Hence, the self-centering mechanism of the device will not be affected.

Parameter Sensitivity

Other than the counterweight force and the friction coefficients, the ASCD has several dimensions (see Table 1), such as, a, b, c, R, h, r, $r_r$, that affect the force-deformation response, especially the nonlinear hardening, energy dissipation, and maximum restoring force. The parameters R and $r_r$ are directly proportional to the restoring force of the ASCD, as observed from Equations 8-14.

Owing to its small magnitude, the influence of $r_r$ on the ASCD force is negligible. The derived parameter I (Equation 7, FIGS. 6 and 8) depends upon c, h, and the displacement (x) of the ASCD. Accordingly, the maximum and minimum values of I can be obtained as:

$$l_{max} = \sqrt{h^2 + (c + x_{max})^2}, \quad l_{min} = \sqrt{h^2 + c^2} \quad \text{(Equation 18)}$$

wherein $x_{max}$ is the desired displacement capacity of the ASCD. The relationship of the ASCD force with a, b, and I is convoluted, as observed from Equations 7, 8, and 14. Further, as per Equation 7, the magnitudes of a, b, and I must satisfy the following constraints:

$$a + b > l_{max}$$

$$a - b < l_{min}$$

$$a > b \quad \text{(Equation 19)}$$

Figure 18:
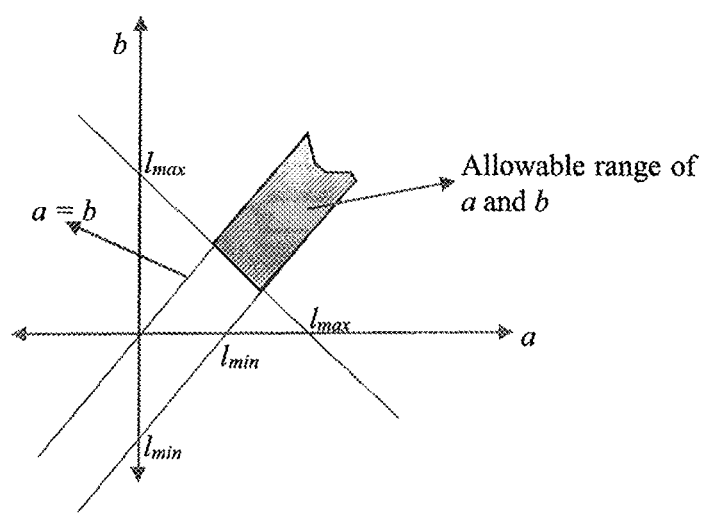
FIG. 18 is a graph illustrating allowable ranges for a and b.
Figure 19:
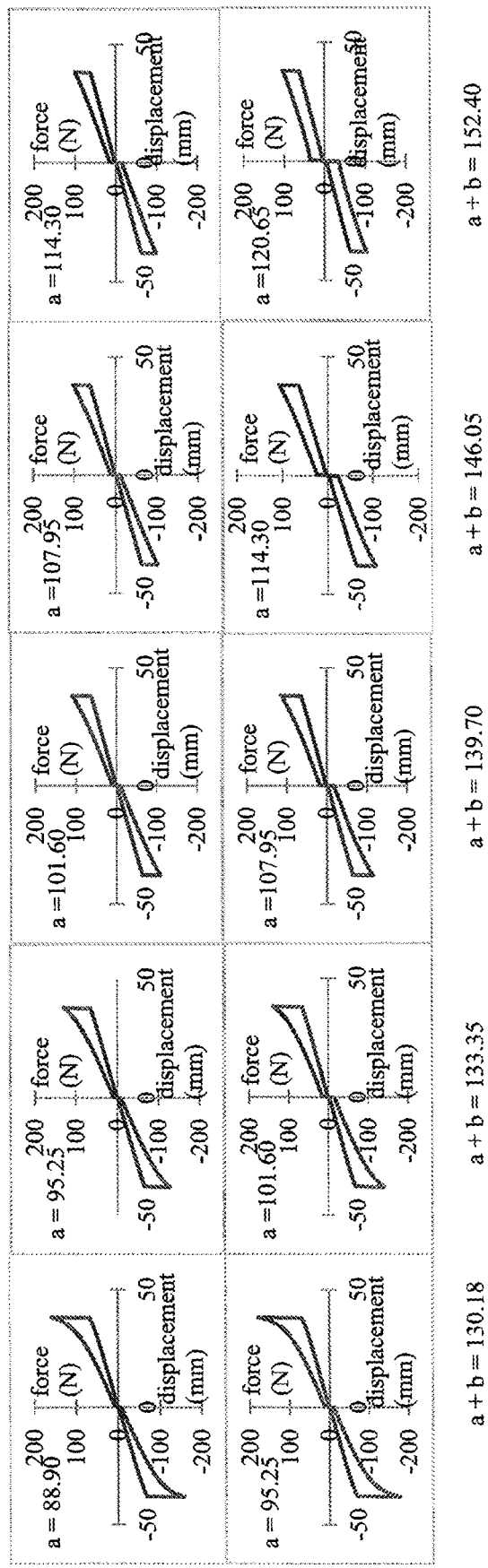
FIG. 19 is a graph which illustrates sensitivity of responses with variations in a and b (a and b are in mm in this example)

The above constraints will also ensure that lever 5 does not get aligned radially to the wheels within the range of operation of the ASCD, which would otherwise cause the apparatus to become locked. The shaded area in FIG. 18 illustrates the allowable ranges for a and b. For the prototype device, as per Table 1, the $I_{max}$ and $I_{min}$ values are 128.17 mm and 100.58 mm, respectively. A sensitivity study is carried out by varying a+b and choosing a and b as illustrated in FIG. 19. Although any counterweight can be used and will provide desirable results, the counterweight for all examples in this application was kept constant at 66.92 N. The parameters, except a and b, are adopted as per Table 1. From FIG. 19, it is observed that the nonlinear hardening, energy dissipation, and maximum restoring force tend to decrease with increasing a+b. Also, for the same a+b, the maximum restoring force and energy dissipation tend to increase with increasing a/b ratio. Hence, it is recommended to design the ASCD with minimum a+b and maximum a/b ratio.

Effect of the Re-Centering Spring, and Friction Between Ratchet and Shaft

Figure 20:
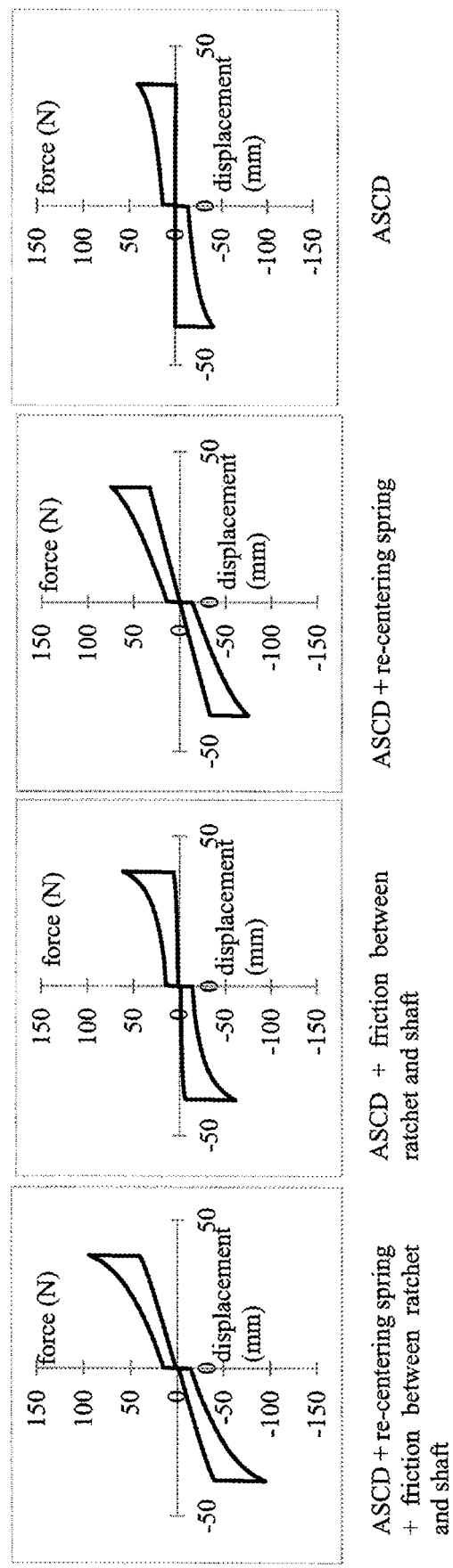
FIG. 20 is a graph which illustrates an effect of a re-centering spring and friction between ratchet and shaft according to an embodiment of the present invention.

The re-centering spring(s) used in the foregoing examples of the ASCD were purely linear. The force-deformation response of the ASCD with and without the re-centering springs is illustrated in FIG. 20. The re-centering spring(s) increases the unloading stiffness of the ASCD. This is desirable in order to re-center the parent structure after a seismic event. Further, the re-centering spring(s) increases the post-elastic stiffness and the restoring force of the ASCD. This helps in reducing the displacement demand.

The force-deformation response of the ASCD with and without consideration of the friction between ratchet wheel and shaft are also illustrated in FIG. 20. Ignoring this friction can result in under-prediction of the force and energy dissipation capacity of the ASCD.

In one embodiment, the counterweight can be increased to 10 kN, 50 kN, 100 kN or more. To generate such huge force, screw-jack mechanisms can optionally be used. Although the maximum displacement capacity can be sized to any desirable amount, in one embodiment, the maximum displacement capacity can be 150 mm, 300 mm, or more. In one embodiment, the dimensions c, h, R, $r_r$, and rare preferably chosen by performing finite element analysis, such that the wheels can sustain those stresses. The dimensions a and b can be chosen by performing the sensitivity analysis, as previously discussed.

Figure 24:
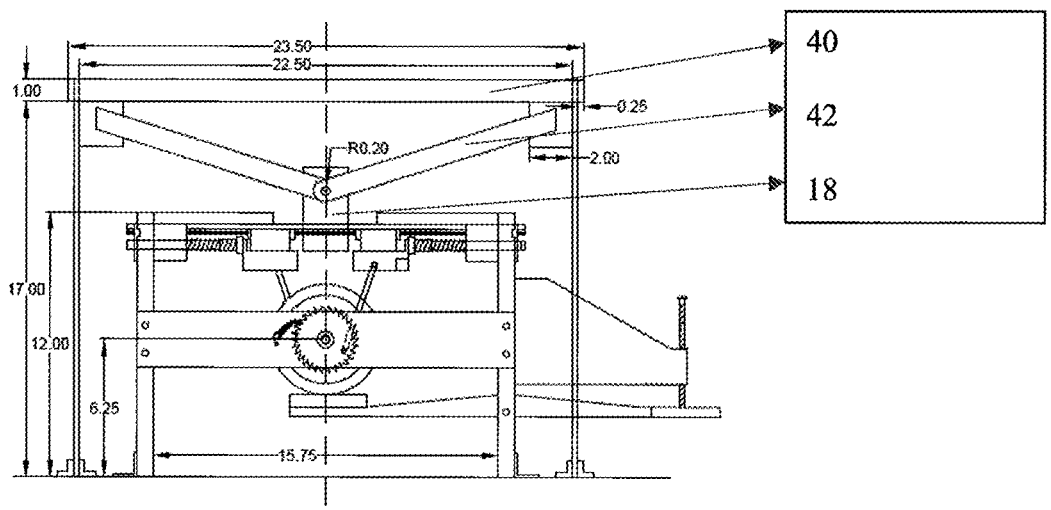
FIG. 24 is a drawing which schematically illustrates an adaptive self-centering device of an embodiment of the present invention connected to a frame with chevron braces.

As illustrated in FIG. 24, an ASDC of an embodiment of the present invention can be connected to a frame 40 of a structure, most preferably via chevron bracing 42 connected to center cartridge 18. Optionally, base 23 of ASDC can be secured to a base of the structure.

Although some of the figures in this application provide dimensions for one or more components, it is to be understood that such dimensions are merely provided to illustrate one embodiment, and such dimensions are not critical or essential to the operation of the invention. Other dimensions, including dimensions significantly different from those illustrated in the figures, can be used and can provide desirable results. Although one embodiment of the present invention preferably provides an ASCD having a pair of friction wheels, ratchet wheels and pawls on a single unit, in one embodiment, an ASCD can be formed by providing two separate units—each configured to operate in an opposing direction from one another. For example, a first unit can have the front friction and ratchet wheel and operate to resist movement in one direction and a second unit can have the rear friction and ratchet wheel and operate to resist movement in a direction that is opposite to that of the first unit.

INDUSTRIAL APPLICABILITY

The invention is further illustrated by the following non-limiting examples.

Example 1

Instrumentational Setup on the ASCD for Experiments

Figure 10:
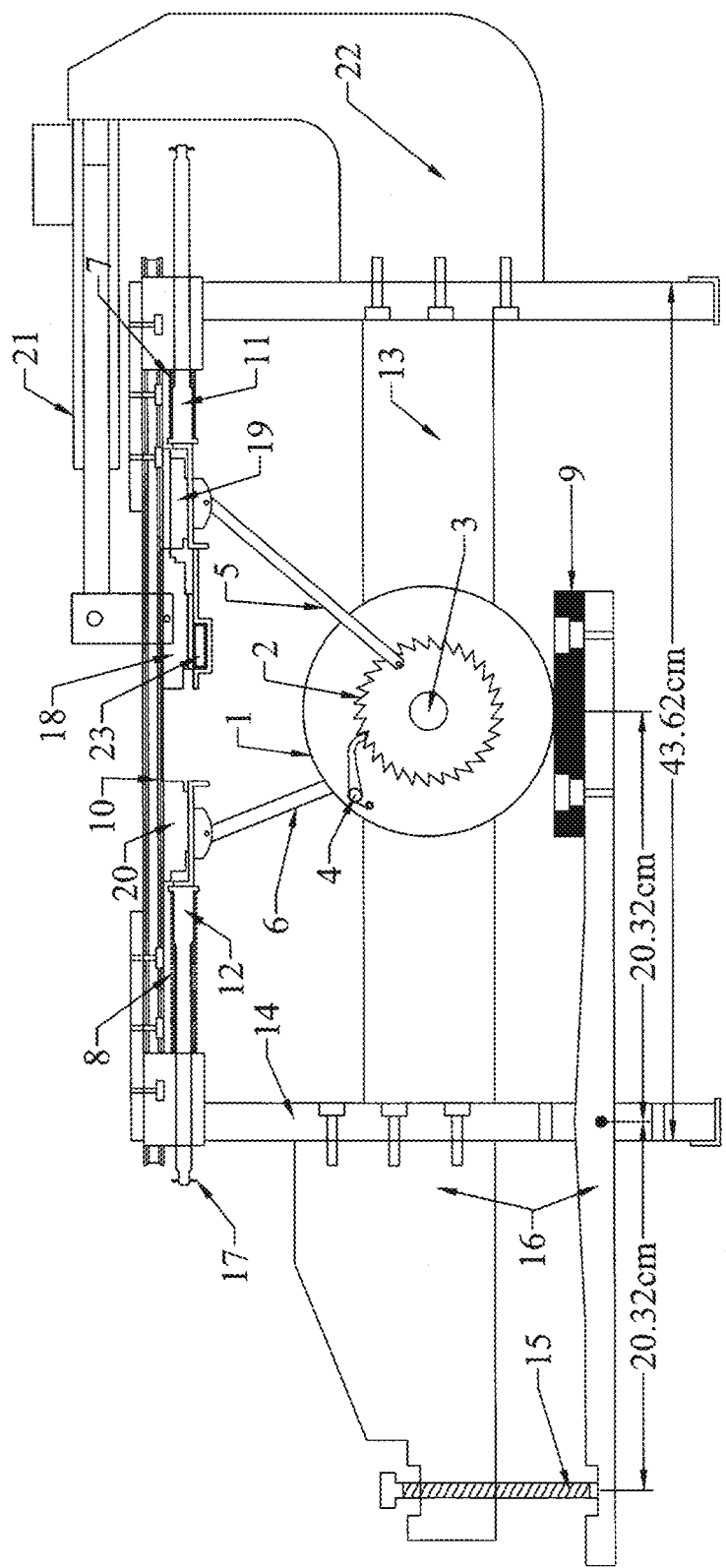
FIG. 10 is a drawing which illustrates an experimental setup of the ASCD according to an embodiment of the present invention.

FIG. 10 illustrates an experimental setup of the device that was constructed wherein center cartridge 18 was connected to actuator 21, which was powered by a 12V DC supply. This cartridge also had tension-compression load cell 23 attached to it, which measured the force applied to cartridge 18 by actuator 21.

The counterweight force was measured by another set of load cells that were attached to the tip of counterweight screw 15. The tests were carried out in a displacement controlled fashion. Incremental displacements were applied to the actuator manually by using a two-way control regulator. The magnitudes of different parameters of the ASCD, including the friction coefficients, are illustrated in the following table.

TABLE 1

Parameters of the ASCD

| SI. No. | Symbol | Meaning | Magnitude | Unit |
|---|---|---|---|---|
| 1 | a | \|BD\| | 101.60 | mm. |
| 2 | b | \|OD\| | 31.75 | |
| 3 | c | \|EA\| | 58.90 | |
| 4 | R | Radius of the friction wheel | 63.50 | |
| 5 | h | \|OE\| | 81.53 | |
| 6 | r | Radius of the shaft | 11.81 | |
| 7 | $r_r$ | Mean radius of the ratchet wheel | 38.10 | |
| 8 | $k_{rc}$ | Stiffness of the re-centering spring | 1926.4 | N/m |
| 9 | $\mu_{ar}$ | Coefficient of friction between rubber pad and friction wheel | 0.64 | — |
| 10 | $\mu_{ss}$ | Coefficient of friction between shaft and ratchet wheel, and between ratchet wheel and pawl (adopted) | 0.80 | — |

Responses from Quasi-Static Experiments

FIGS. 11-13 illustrate lateral force F (from experiment and analytical formulations) and lateral displacement (x) responses for quasi-static cyclic displacement input for various magnitudes of the counterweight forces. The analytical estimations of all the forces in all cases were within about 10% of the experimental values. For a counterweight force of P=111.21 N (25 lb.), a maximum force of 310.26 N (see FIG. 11) was obtained at the maximum displacement of 37.86 mm, while the hysteretic yield force was 88 N. When the counterweight was reduced to P=88.96 N (20 lb.), a maximum force of 273.44 N (see FIG. 12) was obtained for a maximum displacement of 37.86 mm, with the hysteretic yield force as 71.2 N. With further reduction of the counterweight to P=66.92 N (15 lb.), a maximum force of 225.09 N (see FIG. 13) was obtained at 38.1 mm displacement and the hysteretic yield force of 55.70 N was noted. Hence the ASCD had an average linearized post-elastic stiffness of 5205.03 N/m during loading (when $x.\Delta x>0$), which was 2.7 times the stiffness of the re-centering spring. The greater post-elastic stiffness during loading produced larger energy dissipation. Further, the loading path in all cases showed a non-linear hardening which conformed to the adaptive behavior as mentioned earlier. This nonlinear hardening was a result of the lever mechanism of the ASCD, by which the horizontal motion of the cartridges was transferred to rotational motion of the wheels. Mathematically, it can be inferred by the fact that F is a transcendental function of x, as depicted by Equations 6 and 7.

Example 2

The following numerical simulations with an inelastic frame connected to different self-centering systems (constant hardening, nonlinear hardening-SMA, and nonlinear hardening-ASCD) further elucidate the advantage of the ASCD in terms of energy dissipation and displacement demand.

Figure 14:
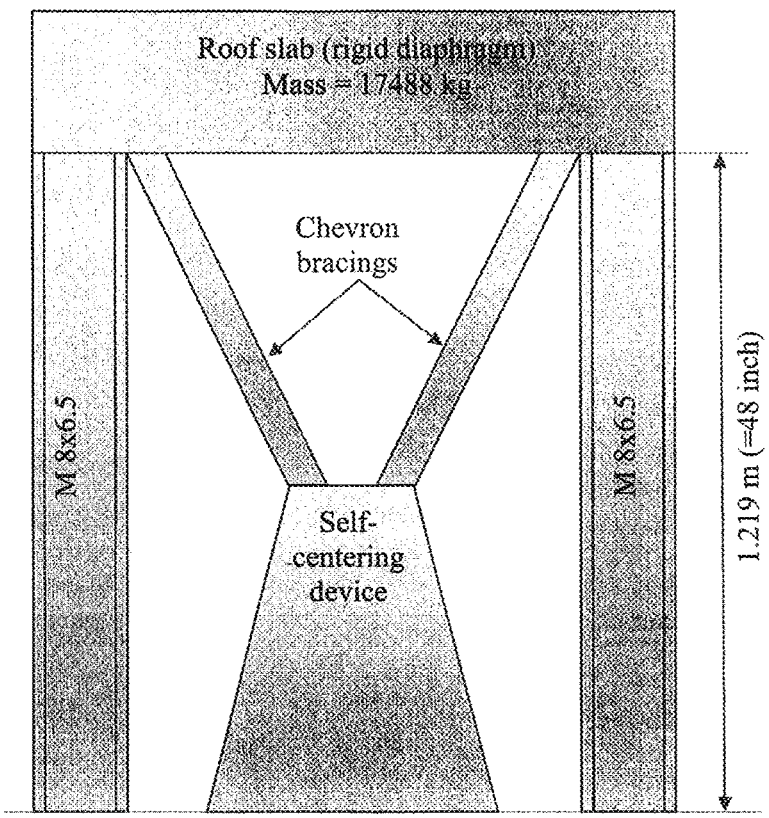
FIG. 14 illustrates a self-centering device, according to an embodiment of the present invention, connected to a frame.

Referring now to FIG. 14, a single bay single story frame, built with AISC 2013M 8×6.5 sections supporting a rigid diaphragm of translational mass 17,488 kg, was considered. The yield strength of the steel and the post-elastic kinematic hardening coefficient of the steel were adopted as 344.74 MPa (50 ksi) and 0.05, respectively. In this simulation, self-centering devices were connected to the system through rigid chevron bracings. In this example, the yield force, elastic stiffness, and the initial post-elastic hardening coefficient of all the devices were adopted as 9.8 kN, 38.5 kN/m, and 0.01, respectively. To generate the nonlinear hardening, linear variation of post-elastic stiffness was considered for the SMA and the ASCD. The frame with each of the devices separately was subjected to analysis based on data of the first 27 seconds of the 1940 Imperial Valley accelerogram with peak ground acceleration of 0.31 g.

Figure 15:
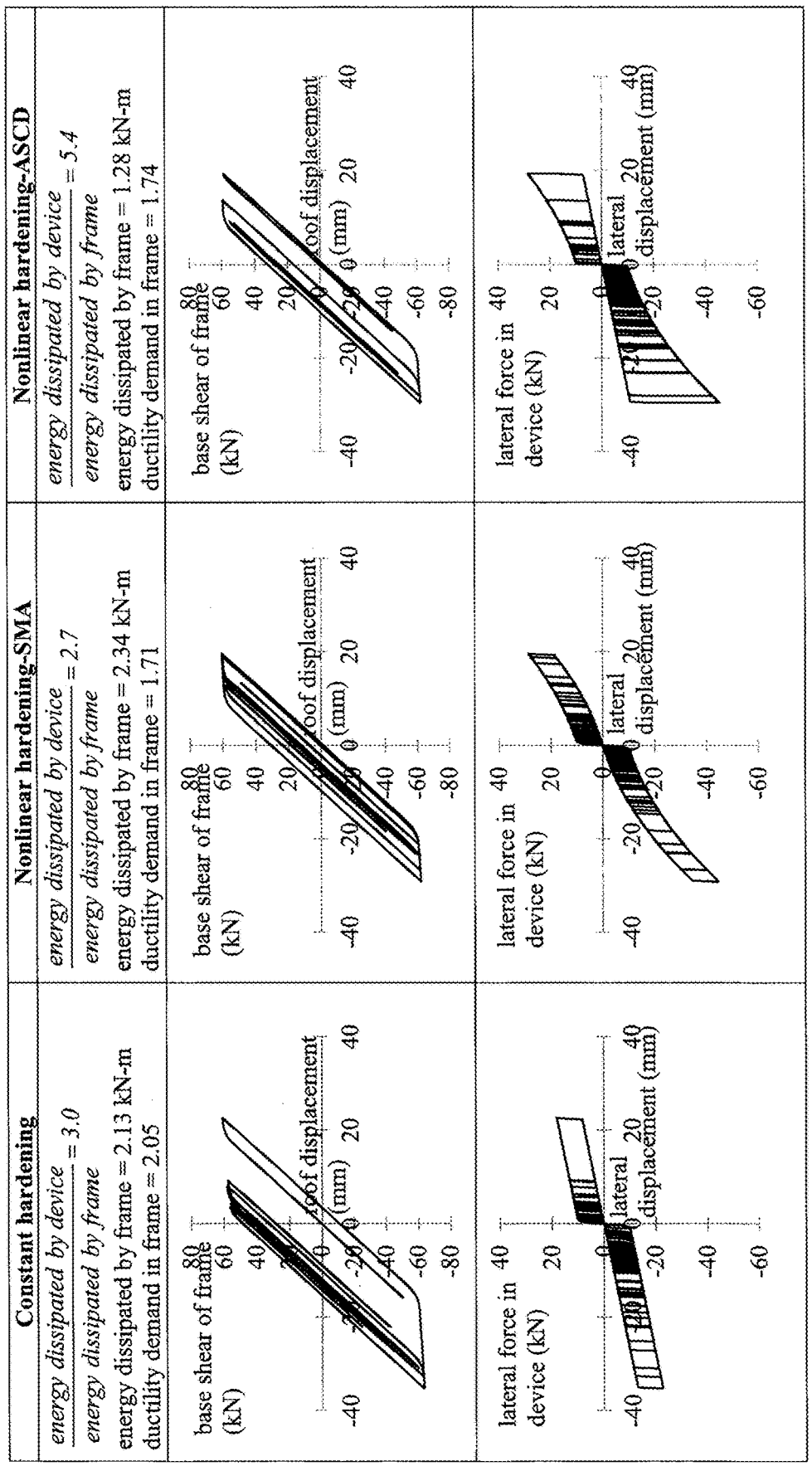
FIG. 15 is a drawing which illustrates comparisons between dynamic responses of different self-centering systems with respect to the ductility demand and energy dissipation of the parent frame.

FIG. 15 illustrates the base shear (V) versus roof displacement (u) responses of the parent frame, and also the lateral force (F)-displacement (u) responses of the different self-centering devices. The ratio of energy dissipation between the ASCD and the parent structure was maximum (5.4), when compared to the constant hardening and SMA based self-centering systems. Hence, the parent structure dissipated the least energy (1.28 kN-m) when connected to the ASCD. The ductility demand of the parent structure with ASCD was comparable (<2% difference) to that with the SMA. The ductility demand of the parent frame with constant hardening self-centering system was 20% higher than that with the nonlinear hardening based self-centering systems.

The structure was also analyzed for two other cycloidal strong pulse ground motions, such as the Northridge 1994 recorded at Century City (scaled to 0.61 g) and Loma Prieta 1989 recorded at Gillroy station (scaled to 0.73 g). For the Northridge motion, the ratio of energy dissipation by the ASCD and the parent structure was found to be 1.96, while the same for SMA and constant hardening self-centering systems were 0.95 and 1.04, respectively. The parent structure dissipated the least energy (7.12 kN-m) when connected with ASCD, compared to SMA (10.96 kN-m) and constant hardening (9.72 kN-m) systems. For the Loma Prieta motion, the above ratio was also higher with the ASCD (0.95) compared to the SMA (0.52) and constant hardening (0.17) systems. The parent structure dissipated the least energy (9.42 kN-m) when connected with ASCD, compared to SMA (10.41 kN-m) and constant hardening (55.07 kN-m) systems.

Application as a Seismic Isolator

Figure 16:
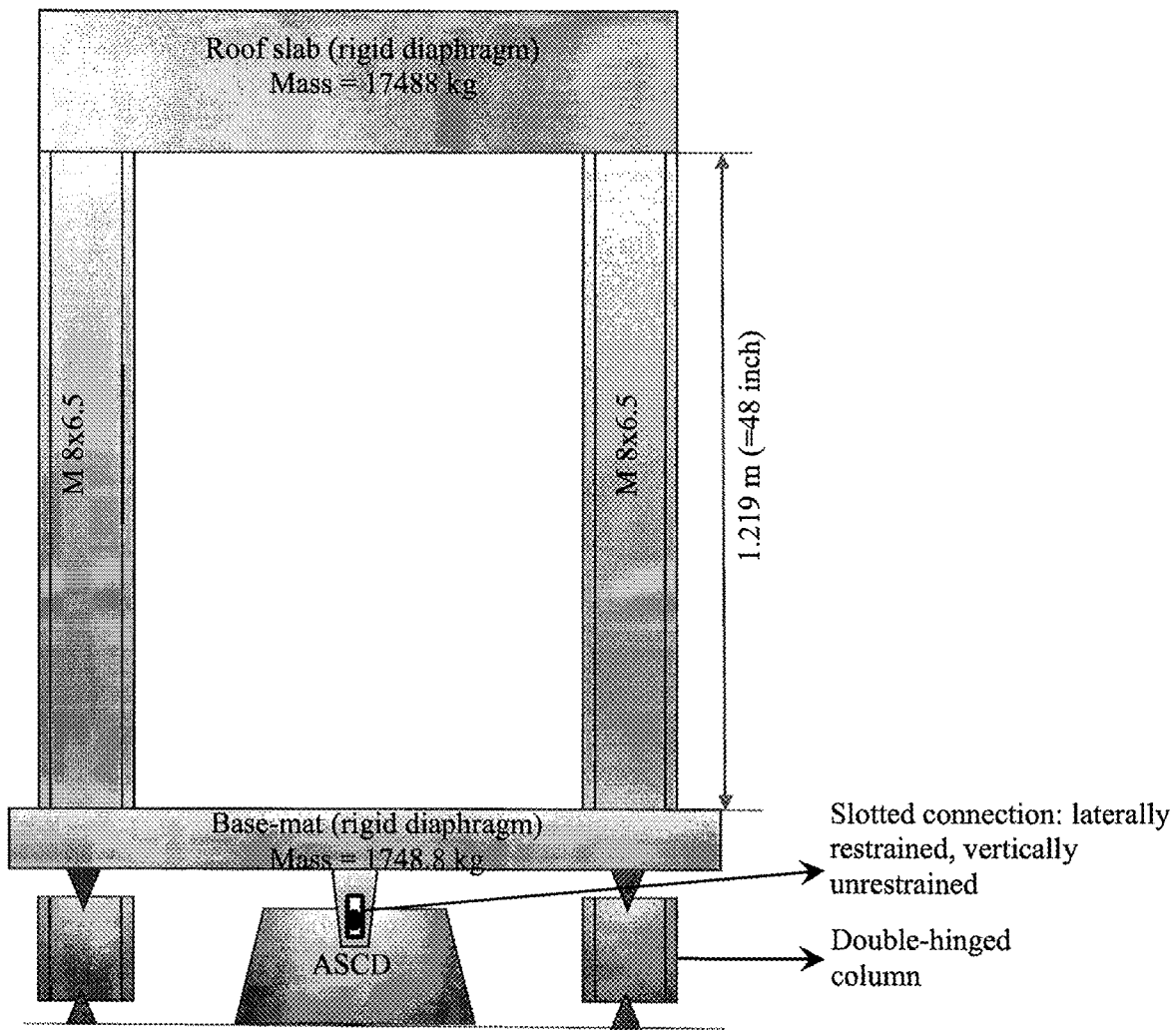
FIG. 16 is a drawing which illustrates a frame connected to an ASCD base-isolator system according to an embodiment of the present invention.
Figure 17:
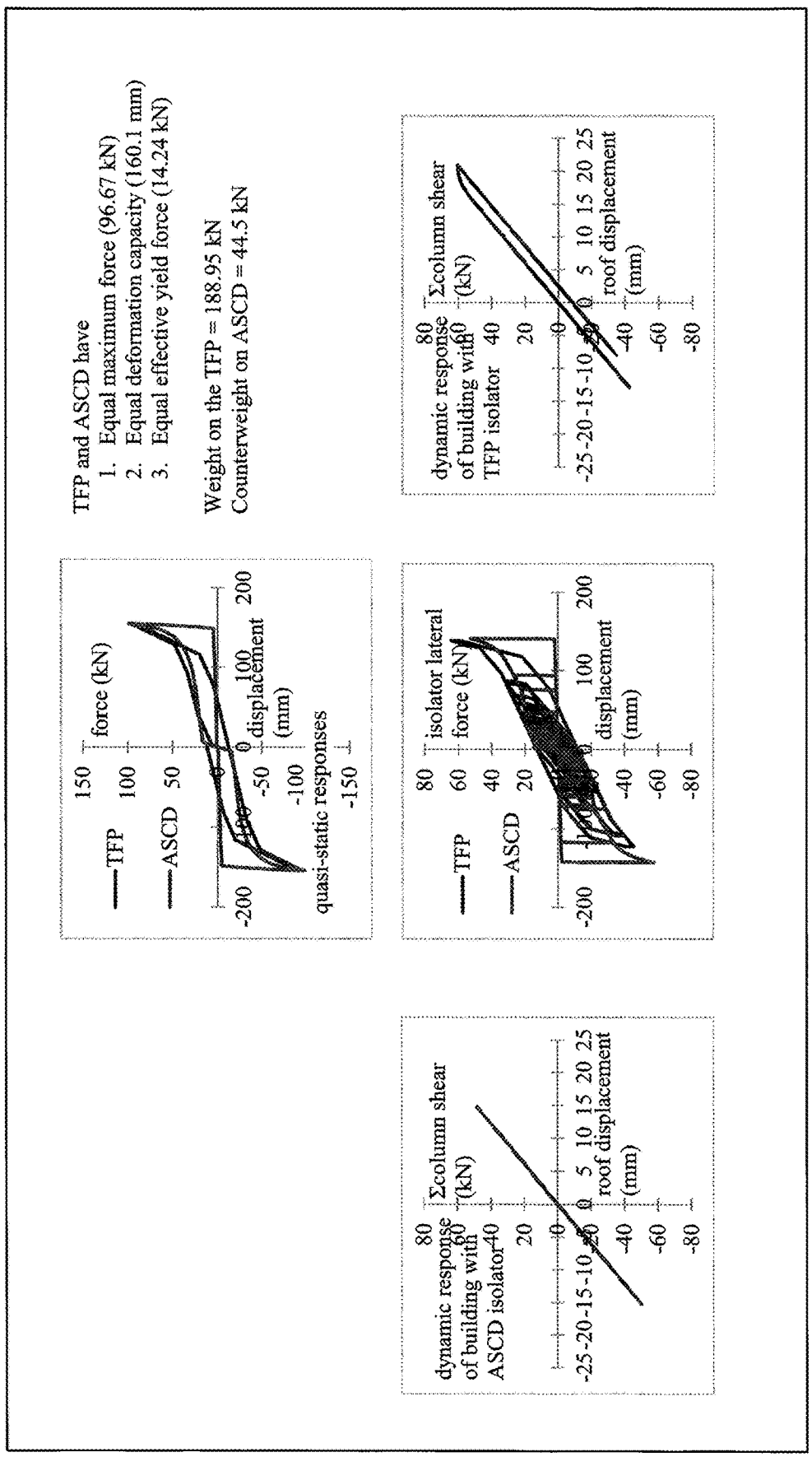
FIG. 17 is a drawing which illustrates dynamic responses of a building with triple friction pendulum (TFP) and ASCD isolators.

The ASCD also performed better than the state-of-the-art base-isolator triple friction pendulum (TFP), when both were calibrated to have similar force deformation responses, as demonstrated herein with analytical simulations. The superstructure, as illustrated in FIG. 16, was the same frame as mentioned above. The TFP had effective radii as 435.36 mm, 53.34 mm, 53.34 mm, and 435.36 mm; displacement capacities of the sliding surfaces were 61 mm, 19.05 mm, 19.05 mm, and 61 mm; and coefficients of friction were 0.033, 0.0125, 0.0125, 0.11. For the analytical simulation, the superstructure including the base-mat was considered to be placed on one such TFP. Thus, the TFP had a compressive load of 188.95 kN. The ASCD was assumed to be installed beneath the base-mat of the structure with double hinged gravity columns, as illustrated in FIG. 16. The ASCD provided the lateral stability and the gravity columns provide the vertical support to the structure. The ASCD parameters were calibrated (see Table 2) to match the basic responses of the TFP, such as effective yield force (14.24 kN), nonlinear hardening in loading, and maximum force (96.67 kN) at maximum displacement (160.1 mm). The comparison of the quasi-static responses of these two isolators for their full deformation capacity of 160.1 mm is illustrated in FIG. 17.

TABLE 2

Calibrated Parameters of the ASCD to match the chosen TFP

| Sl. No. | Symbol | Meaning | Magnitude | Unit |
|---|---|---|---|---|
| 1 | a | \|BD\| | 248.92 | mm. |
| 2 | b | \|OD\| | 61.25 | |
| 3 | c | \|EA\| | 58.90 | |
| 4 | R | Radius of the friction wheel | 165.1 | |
| 5 | h | \|OE\| | 203.2 | |
| 6 | r | Radius of the shaft | 11.81 | |
| 7 | $r_r$ | Mean radius of the ratchet wheel | 114.3 | |
| 8 | $k_{rc}$ | Stiffness of the re-centering spring | 17.51 | kN/m |
| 9 | $\mu_{ar}$ | Coefficient of friction between rubber pad and friction wheel | 0.64 | — |
| 10 | $\mu_{ss}$ | Coefficient of friction between shaft and ratchet wheel, and between ratchet wheel and pawl (adopted) | 0.80 | — |

FIG. 17 illustrates that the calibrated ASCD dissipated more energy (7.80 kN-m) than the TFP (6.05 kN-m) in a complete cycle. To predict the effect of this difference in energy dissipation in dynamic response, two separate seismic analyses were performed with the TFP and ASCD isolators. The ground motion chosen was the 1940 Imperial Valley earthquake, with the peak ground acceleration scaled to 0.63 g. The dynamic responses are illustrated in FIG. 17. The superstructure attained plasticization while isolated with the TFP, whereas it remains elastic while isolated with the ASCD. Similar analyses were done with the isolated structure with Northridge 1994 recorded at Century City (scaled to 0.58 g) and Loma Prieta 1989 recorded at Gillroy station (scaled to 0.63 g). In these cases, the parent structure also yielded when isolated with the TFP, but remained elastic when isolated with the ASCD. This was because the ASCD dissipated more energy than the TFP. Hence, embodiments of the present invention perform better than the TFP for the selected set of motions, when they are calibrated to have same force-deformation and nonlinear hardening responses.

Note that the purpose of the above isolation is not self-centering of the parent structure, as the isolator was connected in series with the parent structure. As long as the isolated structure remained elastic with the ASCD isolator, it had zero permanent deformation. However, when the structure yielded with the TFP isolator, it experienced permanent deformations of 7 mm for 1940 EI Centro, 10 mm for 1994 Northridge, and 41 mm for 1989 Loma Prieta ground motions. In general, any isolated structure is designed to remain elastic.

Example 3

Figure 21A:
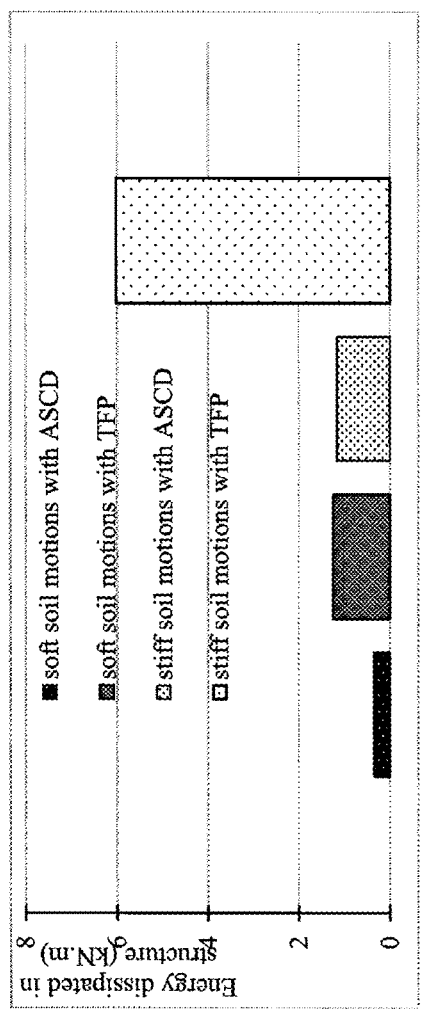
FIGS. 21A, 21B, and 21C are graphs which illustrate results of data obtained through an experimental simulation of different conditions comparing an embodiment of the present invention with respect to memory shaped alloy and normal self-centering dissipater.
Figure 21B:
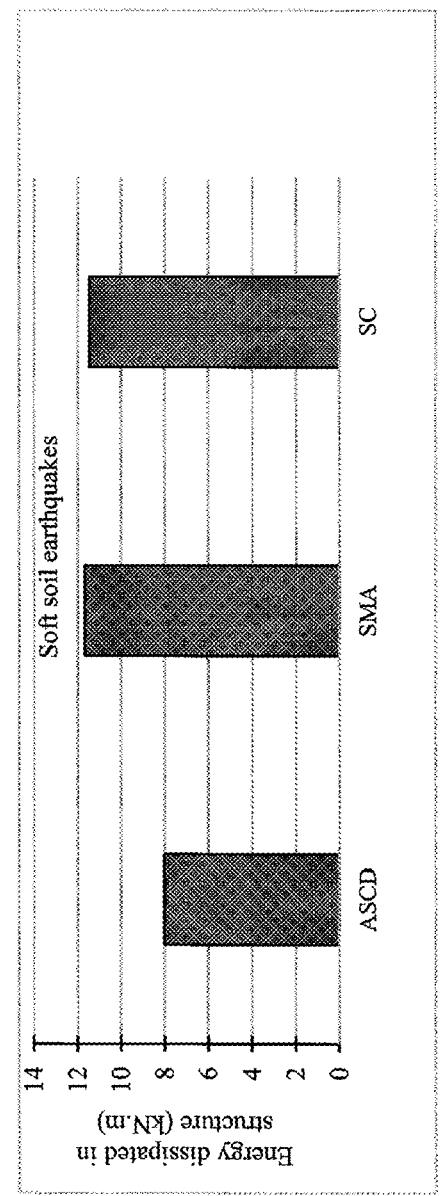
Figure 21C:
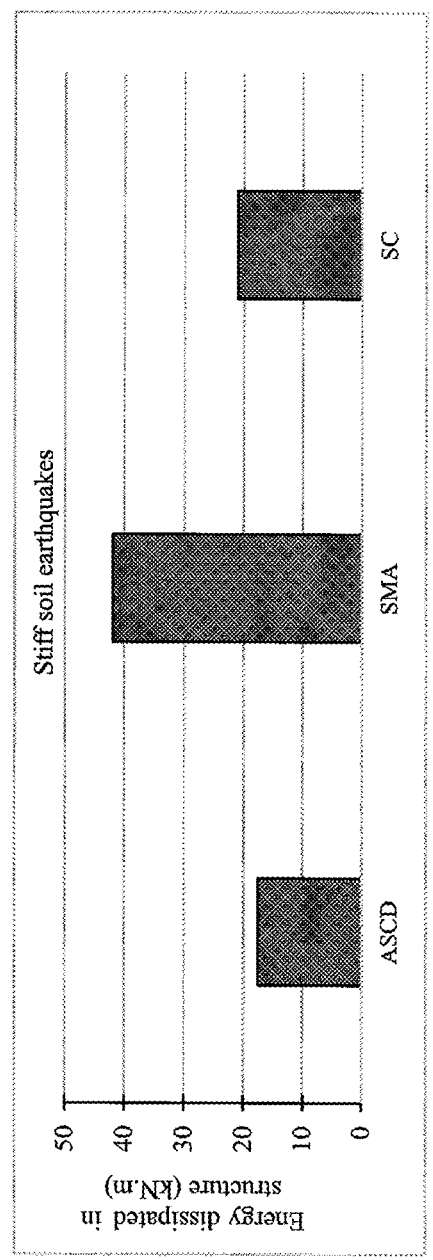
Figure 22:
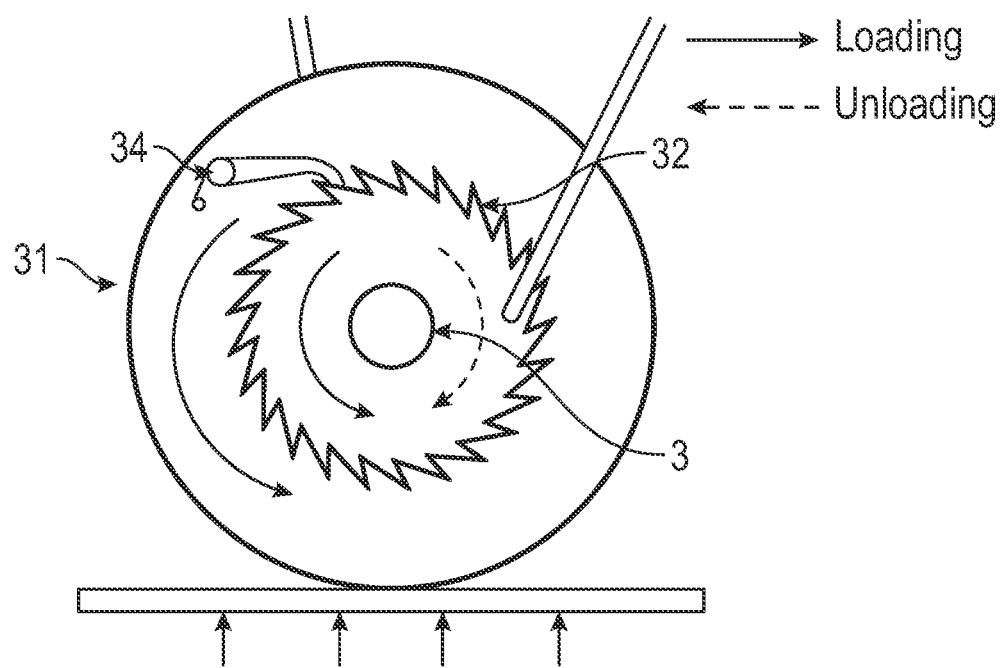
FIG. 22 is a drawing which illustrates a back friction wheel, back ratchet wheel, back pawl, on central shaft, and back pawl viewed from the back.
Figure 23:
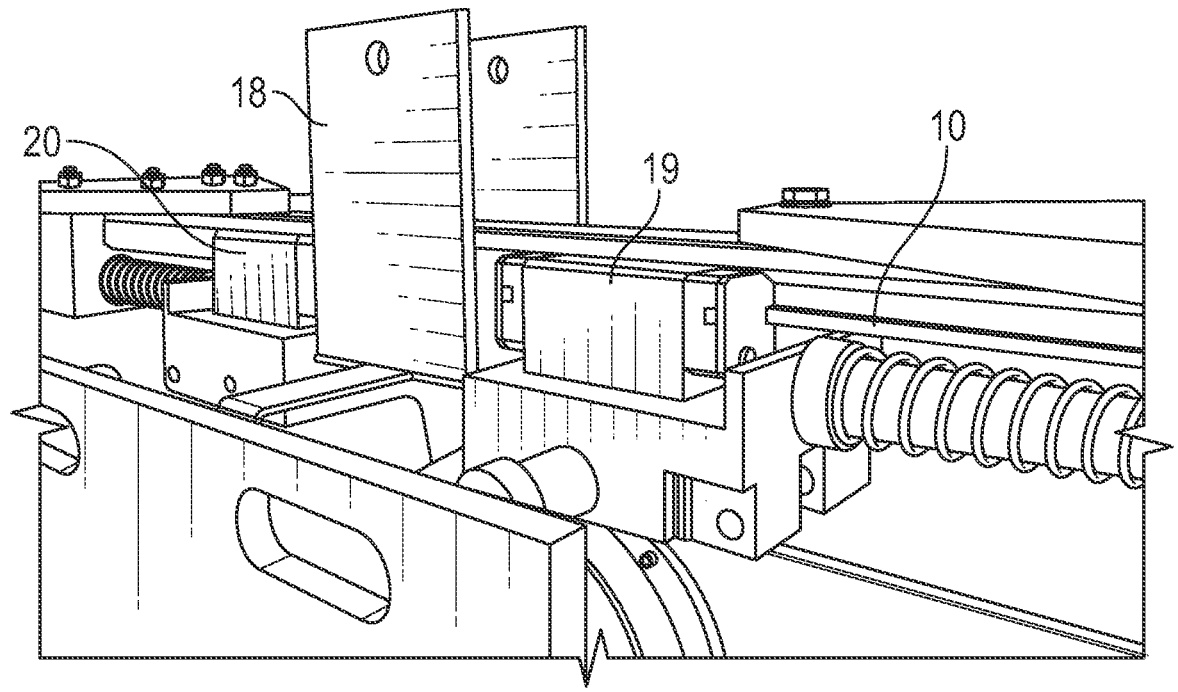
FIG. 23 is a photo which illustrates a detail view of the left, right, and center, cartridges on a slider.

A simulation of an inelastic portal frame (AISC M8×6.5 columns of 1.22 m length and a rigid slab of mass 17500 kg), considered as the superstructure, was analyzed with TFP and ASCD isolators separately for 24 ground motions. It was found that on average the superstructure dissipates less energy, hence suffers less damage, when connected with the ASCD (see FIG. 21A). The same structure, connected with different self-centering dissipaters (ASCD, shape memory alloy ("SMA"), and normal self-centering ("SC")) in parallel, was also analyzed with the same ground motions. It was found that the structure dissipates least energy when connected with the ASCD (see FIGS. 21B and C).

Hypothetical 100-story and 36-story shear buildings, outfitted with frequency independent hysteretic dampers, were analyzed for hurricane scale wind loads. The average of maximum percent reduction in peak floor acceleration ($1a_{max}$), between the bare buildings and corresponding outfitted buildings, normalized by the ratio of number of outfitted stories (#o) over total number of stories (#t), were calculated. The average normalized peak reductions $\{(1a_{max})/(\#o/\#t)\}$ were also computed for simulations of buildings with viscous dampers with/without passive and active TMDs, performed by various researchers. It was observed that the proposed frequency-independent hysteretic damper had the highest average normalized peak reduction.

The preceding examples can be repeated with similar success by substituting the generically or specifically described components and/or operating conditions of embodiments of the present invention for those used in the preceding examples.

Note that in the specification and claims, "about" or "approximately" means within twenty percent (20%) of the numerical amount cited.

Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and and/or reconfiguration of their relationships with one another.

What is claimed is:

1. An adaptive self-centering apparatus comprising:
    a ratchet wheel;
    a friction wheel, said friction wheel and said ratchet wheel rotatable about a common axis;
    a pawl attached to said friction wheel and configured to couple said ratchet wheel to said friction wheel such that they rotate together in a first direction;
    a cartridge communicably coupled to said ratchet wheel such that linear motion of said cartridge causes rotational movement of said ratchet wheel;
    at least one spring configured to cause said cartridge to travel toward a centered position; and
    a friction pad configured to rub against said friction wheel.

2. The adaptive self-centering apparatus of claim 1 wherein said at least one spring comprises two springs.

3. The adaptive self-centering apparatus of claim 1 wherein said friction pad comprises a brake pad.

4. The adaptive self-centering apparatus of claim 3 wherein said brake pad comprises a pair of brake pads that are configured to clamp against said friction wheel.

5. The adaptive self-centering apparatus of claim 1 further comprising a slider on which said cartridge translates along at least a portion thereof.

6. The adaptive self-centering apparatus of claim 1 wherein said at least one ratchet wheel comprises two ratchet wheels, said at least one friction wheel comprises two friction wheels, said at least one cartridge comprises two cartridges, each of said two cartridges connected to a respective one of said two ratchet wheels, and said at least one pawl comprises two pawls, wherein each of said two pawls is attached to a respective one of said friction wheels and configured to couple a respective one of said ratchet wheels to a respective one of said friction wheels.

7. The adaptive self-centering apparatus of claim 6 wherein said at least one spring comprises two springs, and wherein each of said two springs are configured to force a respective one of said two cartridges in an opposing direction from one another.

8. The adaptive self-centering apparatus of claim 6 further comprising a center cartridge disposed between said two cartridges.

9. The adaptive self-centering apparatus of claim 1 further comprising a base.

10. The adaptive self-centering apparatus of claim 9 wherein said base is attached to a building.

\* \* \* \* \*